US012426046B2

(12) United States Patent
Griot et al.

(10) Patent No.: US 12,426,046 B2
(45) Date of Patent: *Sep. 23, 2025

(54) TECHNIQUES FOR SERVICE ESTABLISHMENT IN A SERVICE-BASED WIRELESS SYSTEM

(71) Applicant: QUALCOMM Incorporated, San Diego, CA (US)

(72) Inventors: Miguel Griot, La Jolla, CA (US); Aziz Gholmieh, Del Mar, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 17/948,039

(22) Filed: Sep. 19, 2022

(65) Prior Publication Data

US 2024/0098741 A1 Mar. 21, 2024

(51) Int. Cl.
*H04L 12/28* (2006.01)
*H04W 12/06* (2021.01)
(Continued)

(52) U.S. Cl.
CPC .......... *H04W 72/20* (2023.01); *H04W 12/06* (2013.01); *H04W 76/10* (2018.02)

(58) Field of Classification Search
CPC ..... H04W 72/20; H04W 12/06; H04W 76/10; H04W 48/18; H04L 67/51
(Continued)

(56) References Cited

U.S. PATENT DOCUMENTS 7,783,777 B1 * 8/2010 Pabla ................. G06F 16/1834
709/239
9,654,900 B2 5/2017 Seed et al.
(Continued)

OTHER PUBLICATIONS

3GPP TS 23.501: "3rd Generation Partnership Project, Technical Specification Group Services and System Aspects, System Architecture for the 5G System(5GS), Stage 2 (Release 17)", Technical Specification, 3GPP, Mobile Competence Centre, 650, Route Des Lucioles, F-06921, Sophia-Antipolis Cedex, France, vol. SA WG2, No. V17.5.0, Jun. 15, 2022, pp. 1-568, XP052194570, XP052182880, Chapter 5.7.24.1b, p. 160-p. 161, Paragraph [5.15], Paragraph [5.35].

(Continued)

*Primary Examiner* — Chuong T Ho
(74) *Attorney, Agent, or Firm* — Holland & Hart LLP

(57) ABSTRACT

Methods, systems, and devices for wireless communications are described. In the context of a service-based wireless system, a user equipment (UE) may identify (e.g., via signaling from the network or based on a subscriber identity module (SIM)) a set of core network services offered by a service-based network that interfaces with a radio access network (RAN) associated with the network entity. Each of the respective core network services may be associated with a corresponding network address. The UE may transmit a service request to a network address associated with a core network service included within the set of offered core network services, and may receive a service context for communicating with the core network service in response to the service request. The UE may then communicate service messages with the core network service (via the network entity) in accordance with the received service context.

35 Claims, 17 Drawing Sheets

(51) Int. Cl.
*H04W 72/20* (2023.01)
*H04W 76/10* (2018.01)

(58) Field of Classification Search
USPC .................................................. 370/395.6
See application file for complete search history.

(56) References Cited

U.S. PATENT DOCUMENTS

| | | | | |
|---|---|---|---|---|
| 2003/0119452 | A1* | 6/2003 | Kim | H04W 52/327 455/69 |
| 2006/0114871 | A1 | 6/2006 | Buckley et al. | |
| 2013/0188646 | A1* | 7/2013 | Lu | H04L 41/5019 370/422 |
| 2013/0205043 | A1* | 8/2013 | Lu | H04L 61/106 709/244 |
| 2013/0208592 | A1* | 8/2013 | Lu | H04L 69/161 370/231 |
| 2016/0234198 | A1* | 8/2016 | Breiman | H04L 67/141 |
| 2018/0324204 | A1* | 11/2018 | McClory | G06F 9/5027 |
| 2020/0280562 | A1* | 9/2020 | Salkintzis | H04L 65/612 |
| 2023/0396655 | A1* | 12/2023 | Rodrigo | H04W 12/72 |
| 2024/0073212 | A1* | 2/2024 | Wu | H04L 67/56 |

OTHER PUBLICATIONS

3GPP TS 23.502: "3rd Generation Partnership Project, Technical Specification Group Services and System Aspects, Procedures for the 5G System (5GS), Stage 2 (Release 17)", 3rd Generation Partnership Project, Mobile Competence Centre, 650, Route Des Lucioles, F-06921 Sophia-Antipolis Cedex, France, vol. SA WG2, No. V17.5.0, Jun. 15, 2022, pp. 1-744, XP052182883, Paragraph [04.2], Paragraph [4.11].
International Search Report and Written Opinion—PCT/US2023/073936—ISA/EPO—Jan. 4, 2024.

* cited by examiner

TECHNIQUES FOR SERVICE ESTABLISHMENT IN A SERVICE-BASED WIRELESS SYSTEM

FIELD OF TECHNOLOGY

The following relates to wireless communications, including techniques for service establishment in a service-based wireless system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In the context of a service-based wireless system, a random access network (RAN) may interface with a service-based network that offers or provides various core network services. Each respective core network service may be hosted or provided by a different operator or entity, and may be associated with different sets of parameters for communicating with the respective core network service.

SUMMARY

The described techniques relate to improved methods, systems, devices, and apparatuses that support techniques for service establishment in a service-based wireless system. Generally, aspects of the present disclosure are directed to signaling and other mechanisms that enable user equipments (UEs) to establish wireless connections in a service-based network, such as a Sixth Generation (6G) network. In particular, aspects of the present disclosure may support signaling between UEs, network entities (e.g., distributed units (DUs)), and core network services of a service-based network architecture that enables the UEs to establish and maintain connections with different core network services offered by the network. For example, a UE may establish a connection with network entity of a radio access network (RAN), and may receive control signaling indicating core network services offered by a service-based network that interfaces with the RAN. The control signaling may additionally indicate network addresses for each of the offered core network services. The UE may then transmit (via relay by the network entity) a service request to a network address of an offered core network service, and receive (via relay by the network entity) a service context for communicating with the core network service. The UE may then communicate with the core network service (via relay by the network entity) in accordance with the service context.

A method for wireless communication at a UE is described. The method may include identifying first control information indicating a set of multiple core network services offered by a service-based network configured to interface with a RAN associated with a DU, the first control information indicating a set of multiple network addresses associated with the set of multiple core network services, transmitting, based on the first control information, a service request indicating a first core network service of the set of multiple core network services, the service request including a first network address associated with the first core network service, the set of multiple network addresses including the first network address, receiving control signaling indicating a first service context for communicating with the first core network service based on the service request, and transmitting, in accordance with the first service context, a first service message including the first network address and first service data for the first core network service.

An apparatus for wireless communication at a UE is described. The apparatus may include a processor, memory coupled with the processor, and instructions stored in the memory. The instructions may be executable by the processor to cause the apparatus to identify first control information indicating a set of multiple core network services offered by a service-based network configured to interface with a RAN associated with a DU, the first control information indicating a set of multiple network addresses associated with the set of multiple core network services, transmit, based on the first control information, a service request indicating a first core network service of the set of multiple core network services, the service request including a first network address associated with the first core network service, the set of multiple network addresses including the first network address, receive control signaling indicating a first service context for communicating with the first core network service based on the service request, and transmit, in accordance with the first service context, a first service message including the first network address and first service data for the first core network service.

Another apparatus for wireless communication at a UE is described. The apparatus may include means for identifying first control information indicating a set of multiple core network services offered by a service-based network configured to interface with a RAN associated with a DU, the first control information indicating a set of multiple network addresses associated with the set of multiple core network services, means for transmitting, based on the first control information, a service request indicating a first core network service of the set of multiple core network services, the service request including a first network address associated with the first core network service, the set of multiple network addresses including the first network address, means for receiving control signaling indicating a first service context for communicating with the first core network service based on the service request, and means for transmitting, in accordance with the first service context, a first service message including the first network address and first service data for the first core network service.

A non-transitory computer-readable medium storing code for wireless communication at a UE is described. The code may include instructions executable by a processor to identify first control information indicating a set of multiple core network services offered by a service-based network configured to interface with a RAN associated with a DU, the first control information indicating a set of multiple network addresses associated with the set of multiple core network services, transmit, based on the first control information, a service request indicating a first core network service of the set of multiple core network services, the service request including a first network address associated with the first core network service, the set of multiple network addresses including the first network address, receive control signaling indicating a first service context for communicating with the first core network service based on the service request, and transmit, in accordance with the first service context, a first service message including the first network address and first service data for the first core network service.

Some examples of the method, apparatuses, and non-transitory computer-readable medium described herein may further include operations, features, means, or instructions for transmitting a query for the set of multiple core network services based on establishing a wireless connection between the UE and the DU and receiving the first control information in response to the query.

Some examples of the method, apparatuses, and non-transitory computer-readable medium described herein may further include operations, features, means, or instructions for receiving, from the DU, a network address associated with a core network discovery service offered by the service-based network, where the query may be transmitted to the core network discovery service based on the network address.

Some examples of the method, apparatuses, and non-transitory computer-readable medium described herein may further include operations, features, means, or instructions for transmitting, via the query, capability information associated with the UE, where the set of multiple core network services may be based on the capability information.

Some examples of the method, apparatuses, and non-transitory computer-readable medium described herein may further include operations, features, means, or instructions for receiving, via the first service context for communicating with the first core network service, an indication of a second core network service of the set of multiple core network services, transmitting a second service request indicating the second core network service, the second service request including a second network address associated with the second core network service, and receiving third control signaling indicating a second service context for communicating with the second core network service based on the second service request, where communicating the first service message may be based on receiving the second service context.

Some examples of the method, apparatuses, and non-transitory computer-readable medium described herein may further include operations, features, means, or instructions for communicating, in accordance with the second service context, a second service message including the second network address and second service data for the second core network service, where communicating the first service message may be based on communicating the second service message.

In some examples of the method, apparatuses, and non-transitory computer-readable medium described herein, the second core network service includes a security service associated with the first core network service and the second service context includes authentication information, a key agreement, or both.

In some examples of the method, apparatuses, and non-transitory computer-readable medium described herein, the service request, the first service message, or both, may be transmitted to the DU for relay to the first network address associated with the first core network service.

In some examples of the method, apparatuses, and non-transitory computer-readable medium described herein, the first service context includes a radio access network configuration for communicating with the DU as part of the first core network service.

Some examples of the method, apparatuses, and non-transitory computer-readable medium described herein may further include operations, features, means, or instructions for receiving additional control signaling including the first control information via a wireless connection between the UE and the DU.

In some examples of the method, apparatuses, and non-transitory computer-readable medium described herein, the first control information may be identified based on a subscriber identity module (SIM) associated with the UE.

In some examples of the method, apparatuses, and non-transitory computer-readable medium described herein, each core network service of the set of multiple core network services may be associated with a respective application programming interface (API) of a set of multiple APIs.

In some examples of the method, apparatuses, and non-transitory computer-readable medium described herein, the set of multiple core network services include a mobility service, a connection state management service, a security service, a paging service, a radio access service, a data service, a capability management service, a location service, a messaging service, or any combination thereof.

A method for wireless communication at a DU is described. The method may include receiving, from a UE, a service request indicating a first core network service of a set of multiple core network services offered by a service-based network configured to interface with a RAN associated with the DU, where the set of multiple core network services are associated with a plurality network addresses, the service request including a first network address associated with the first core network service, the set of multiple network addresses including the first network address, transmitting the service request to the first network address, transmitting, to the UE, control signaling received from the first core network service based on the service request, the control signaling indicating a first service context for communications between the UE and the first core network service, and communicating a first service message received from the UE to the first core network service in accordance with the first service context, the first service message including the first network address and first service data for the first core network service.

An apparatus for wireless communication at a DU is described. The apparatus may include a processor, memory coupled with the processor, and instructions stored in the memory. The instructions may be executable by the processor to cause the apparatus to receive, from a UE, a service request indicating a first core network service of a set of multiple core network services offered by a service-based network configured to interface with a RAN associated with the DU, where the set of multiple core network services are associated with a plurality network addresses, the service request including a first network address associated with the first core network service, the set of multiple network addresses including the first network address, transmit the service request to the first network address, transmit, to the UE, control signaling received from the first core network service based on the service request, the control signaling indicating a first service context for communications between the UE and the first core network service, and communicate a first service message received from the UE to the first core network service in accordance with the first service context, the first service message including the first network address and first service data for the first core network service.

Another apparatus for wireless communication at a DU is described. The apparatus may include means for receiving, from a UE, a service request indicating a first core network service of a set of multiple core network services offered by a service-based network configured to interface with a RAN associated with the DU, where the set of multiple core network services are associated with a plurality network addresses, the service request including a first network address associated with the first core network service, the set of multiple network addresses including the first network address, means for transmitting the service request to the first network address, means for transmitting, to the UE, control signaling received from the first core network service based on the service request, the control signaling indicating a first service context for communications between the UE and the first core network service, and means for communicating a first service message received from the UE to the first core network service in accordance with the first service context, the first service message including the first network address and first service data for the first core network service.

A non-transitory computer-readable medium storing code for wireless communication at a DU is described. The code may include instructions executable by a processor to receive, from a UE, a service request indicating a first core network service of a set of multiple core network services offered by a service-based network configured to interface with a RAN associated with the DU, where the set of multiple core network services are associated with a plurality network addresses, the service request including a first network address associated with the first core network service, the set of multiple network addresses including the first network address, transmit the service request to the first network address, transmit, to the UE, control signaling received from the first core network service based on the service request, the control signaling indicating a first service context for communications between the UE and the first core network service, and communicate a first service message received from the UE to the first core network service in accordance with the first service context, the first service message including the first network address and first service data for the first core network service.

Some examples of the method, apparatuses, and non-transitory computer-readable medium described herein may further include operations, features, means, or instructions for transmitting, to the UE, second control signaling indicating the set of multiple core network services offered by the service-based network, the second control signaling indicating the set of multiple network addresses associated with the set of multiple core network services, where receiving the service request may be based on transmitting the second control signaling.

Some examples of the method, apparatuses, and non-transitory computer-readable medium described herein may further include operations, features, means, or instructions for transmitting a query for the set of multiple core network services and receiving an indication of the set of multiple core network services in response to the query, where transmitting the control signaling may be based on receiving an indication of the set of multiple core network services.

Some examples of the method, apparatuses, and non-transitory computer-readable medium described herein may further include operations, features, means, or instructions for transmitting, to the UE, a network address associated with a core network discovery service offered by the service-based network, where the query may be received from the UE and transmitted to the core network discovery service based on the network address.

Some examples of the method, apparatuses, and non-transitory computer-readable medium described herein may further include operations, features, means, or instructions for transmitting, via the query, capability information associated with the UE, where the set of multiple core network services may be based on the capability information.

Some examples of the method, apparatuses, and non-transitory computer-readable medium described herein may further include operations, features, means, or instructions for transmitting, via the first service context for communicating with the first core network service, an indication of a second core network service of the set of multiple core network services, receiving, from the UE, a second service request indicating the second core network service, the second service request including a second network address associated with the second core network service, transmitting the second service request to the second network address, and transmitting, to the UE, second control signaling received from the second core network service based on the second service request, the second control signaling indicating a second service context for communications between the UE and the second core network service, where communicating the first service message may be based on transmitting the second service context.

Some examples of the method, apparatuses, and non-transitory computer-readable medium described herein may further include operations, features, means, or instructions for communicating a second service message received from the UE to the second core network service in accordance with the second service context, the second service message including the second network address and second service data for the second core network service, where communicating the first service message may be based on communicating the second service message.

In some examples of the method, apparatuses, and non-transitory computer-readable medium described herein, the second core network service includes a security service associated with the first core network service and the second service context includes authentication information, a key agreement, or both.

In some examples of the method, apparatuses, and non-transitory computer-readable medium described herein, the first service context includes a radio access network configuration for communicating with the UE as part of the first core network service.

In some examples of the method, apparatuses, and non-transitory computer-readable medium described herein, each core network service of the set of multiple core network services may be associated with a respective API of a set of multiple APIs.

In some examples of the method, apparatuses, and non-transitory computer-readable medium described herein, the set of multiple core network services include a mobility service, a connection state management service, a security service, a paging service, a radio access service, a data service, a capability management service, a location service, a messaging service, or any combination thereof.

A method for wireless communication at a first core network service is described. The method may include receiving, from a UE via DU, a service request indicating the first core network service, the service request including a first network address associated with the first core network service, where the first core network service is included within a set of multiple core network services offered by a service-based network configured to interface with a RAN associated with the DU, transmitting, to the UE via the DU, first control signaling indicating a first service context for communicating with the first core network service based on the service request, and receiving, in accordance with the first service context, a first service message including the first network address and first service data for the first core network service.

An apparatus for wireless communication at a first core network service is described. The apparatus may include a processor, memory coupled with the processor, and instructions stored in the memory. The instructions may be executable by the processor to cause the apparatus to receive, from a UE via DU, a service request indicating the first core network service, the service request including a first network address associated with the first core network service, where the first core network service is included within a set of multiple core network services offered by a service-based network configured to interface with a RAN associated with the DU, transmit, to the UE via the DU, first control signaling indicating a first service context for communicating with the first core network service based on the service request, and receive, in accordance with the first service context, a first service message including the first network address and first service data for the first core network service.

Another apparatus for wireless communication at a first core network service is described. The apparatus may include means for receiving, from a UE via DU, a service request indicating the first core network service, the service request including a first network address associated with the first core network service, where the first core network service is included within a set of multiple core network services offered by a service-based network configured to interface with a RAN associated with the DU, means for transmitting, to the UE via the DU, first control signaling indicating a first service context for communicating with the first core network service based on the service request, and means for receiving, in accordance with the first service context, a first service message including the first network address and first service data for the first core network service.

A non-transitory computer-readable medium storing code for wireless communication at a first core network service is described. The code may include instructions executable by a processor to receive, from a UE via DU, a service request indicating the first core network service, the service request including a first network address associated with the first core network service, where the first core network service is included within a set of multiple core network services offered by a service-based network configured to interface with a RAN associated with the DU, transmit, to the UE via the DU, first control signaling indicating a first service context for communicating with the first core network service based on the service request, and receive, in accordance with the first service context, a first service message including the first network address and first service data for the first core network service.

Some examples of the method, apparatuses, and non-transitory computer-readable medium described herein may further include operations, features, means, or instructions for transmitting, via the first service context for communicating with the first core network service, an indication of a second core network service of the set of multiple core network services, where receiving the first service message may be based on the indication of the second core network service.

In some examples of the method, apparatuses, and non-transitory computer-readable medium described herein, the second core network service includes a security service associated with the first core network service.

In some examples of the method, apparatuses, and non-transitory computer-readable medium described herein, the first service context includes a radio access network configuration for communications between the UE and the DU as part of the first core network service.

In some examples of the method, apparatuses, and non-transitory computer-readable medium described herein, each core network service of the set of multiple core network services may be associated with a respective API of a set of multiple APIs.

In some examples of the method, apparatuses, and non-transitory computer-readable medium described herein, the set of multiple core network services include a mobility service, a connection state management service, a security service, a paging service, a radio access service, a data service, a capability management service, a location service, a messaging service, or any combination thereof.

A method for wireless communication at a core network discovery service is described. The method may include receiving, from a UE via a DU, a query for a set of multiple core network services offered by a service-based network configured to interface with a RAN associated with the DU and transmitting, to the DU for relay to a UE, first control signaling indicating the set of multiple core network services, the first control signaling indicating a set of multiple network addresses associated with the set of multiple core network services.

An apparatus for wireless communication at a core network discovery service is described. The apparatus may include a processor, memory coupled with the processor, and instructions stored in the memory. The instructions may be executable by the processor to cause the apparatus to receive, from a UE via a DU, a query for a set of multiple core network services offered by a service-based network configured to interface with a RAN associated with the DU and transmit, to the DU for relay to a UE, first control signaling indicating the set of multiple core network services, the first control signaling indicating a set of multiple network addresses associated with the set of multiple core network services.

Another apparatus for wireless communication at a core network discovery service is described. The apparatus may include means for receiving, from a UE via a DU, a query for a set of multiple core network services offered by a service-based network configured to interface with a RAN associated with the DU and means for transmitting, to the DU for relay to a UE, first control signaling indicating the set of multiple core network services, the first control signaling indicating a set of multiple network addresses associated with the set of multiple core network services.

A non-transitory computer-readable medium storing code for wireless communication at a core network discovery service is described. The code may include instructions executable by a processor to receive, from a UE via a DU, a query for a set of multiple core network services offered by a service-based network configured to interface with a RAN associated with the DU and transmit, to the DU for relay to a UE, first control signaling indicating the set of multiple core network services, the first control signaling indicating a set of multiple network addresses associated with the set of multiple core network services.

Some examples of the method, apparatuses, and non-transitory computer-readable medium described herein may further include operations, features, means, or instructions for transmitting, to the DU, a network address associated with the core network discovery service offered by the service-based network, where the query may be received based on the network address.

Some examples of the method, apparatuses, and non-transitory computer-readable medium described herein may further include operations, features, means, or instructions for receiving, via the query, capability information associated with the UE, where the set of multiple core network services may be based on the capability information.

In some examples of the method, apparatuses, and non-transitory computer-readable medium described herein, each core network service of the set of multiple core network services may be associated with a respective API of a set of multiple APIs.

In some examples of the method, apparatuses, and non-transitory computer-readable medium described herein, the set of multiple core network services include a mobility service, a connection state management service, a security service, a paging service, a radio access service, a data service, a capability management service, a location service, a messaging service, or any combination thereof.

DETAILED DESCRIPTION

Figure 1:
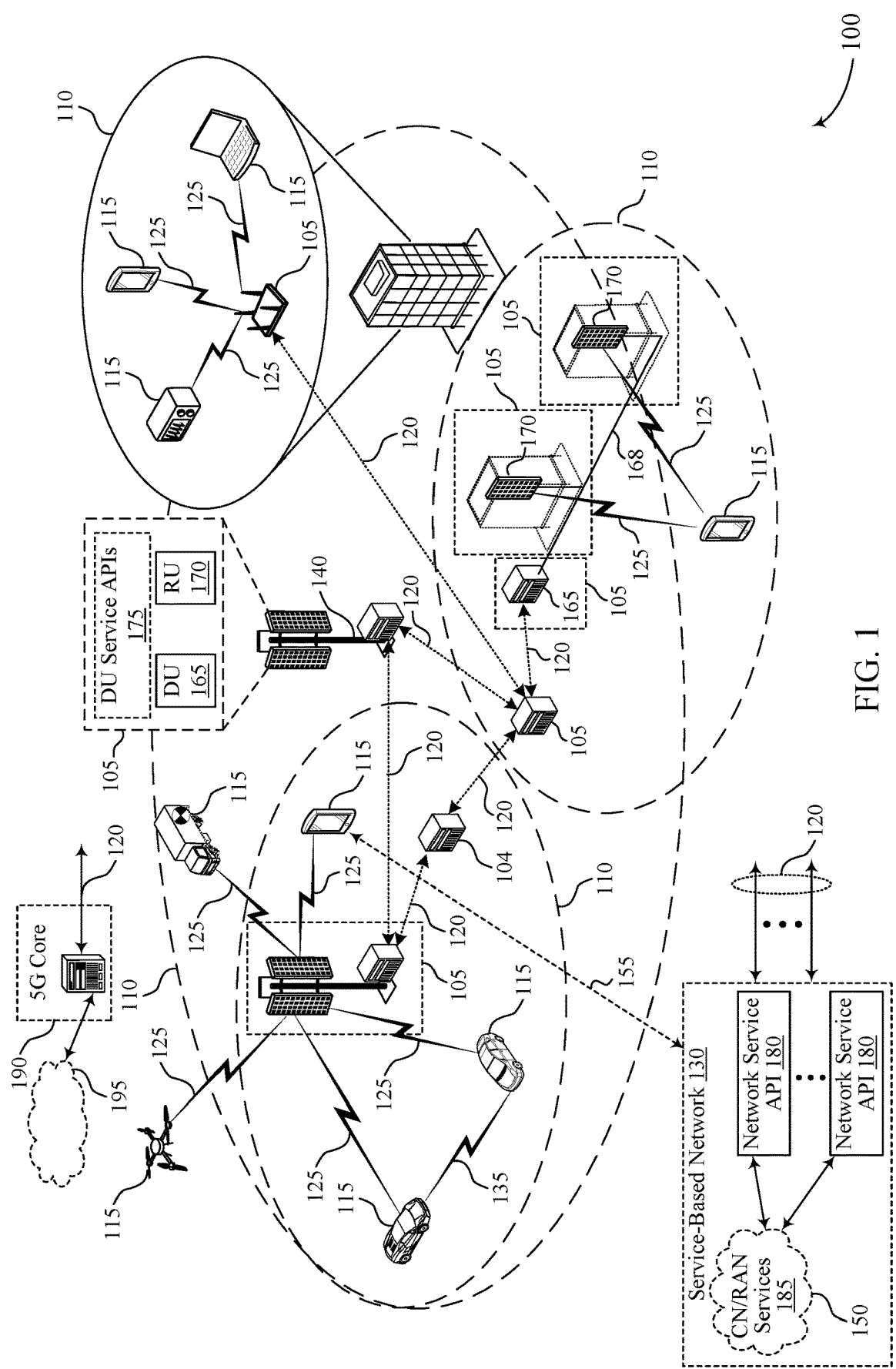
FIG. 1 illustrates an example of a wireless communications system that supports techniques for service establishment in a service-based wireless system in accordance with one or more aspects of the present disclosure.

Some wireless systems may exhibit a relatively vertical, hierarchical architecture that includes many "layers" of different devices that perform functions for the system. For example, a wireless system may include user equipments (UEs), base stations/network entities, and numerous back-end (e.g. core network) devices associated with one or more functions for the system. Such a hierarchical structure may result in processing and other functions being performed at multiple devices (e.g., duplicative processing or capabilities across multiple back-end devices), thereby leading to wasted resources and excess power consumption. Additionally, the back-end architecture of some wireless systems may be owned and maintained by a small handful of operators, which may make it difficult for other parties/entities to integrate with the systems and may complicate the ability of the systems to offer customized services and functionality to wireless devices.

Comparatively, some wireless systems, such as Sixth Generation (6G) systems, may exhibit a flatter, service-based architecture in which a radio access network (RAN) (e.g., network entities) interfaces with a service-based network in order to connect UEs to core network services maintained at various network addresses within the service-based network. In the context of a service-based system, operations and functions that may otherwise be performed by a few centralized back-end components (e.g., in some systems) may be distributed across a number of core network services that may be hosted at different network addresses, such as in a cloud-based architecture. As a result, UEs in a service-based system may be able to establish and maintain connections with (e.g., "subscribe" to) different core network services or groups thereof on an a la carte basis, where each core network service offers or provides a respective network functionality or service. For example, a service-based system may include a mobility service, a security service, a privacy service, a location service, and the like. In this regard, each UE within a service-based system may be able to select to which core network services the UE will subscribe based on the individualized characteristics or needs of the respective UE.

In some wireless systems, a RAN may interface with a service-based network that offers various core network services, and may relay communications between UEs and the respective core network service. In particular, the UE may subscribe to various core network services offered by the service-based network. However, each respective core network service may be hosted or provided by a different operator or entity, and may be associated with different sets of parameters for communicating with the respective core network services. In other words, communications parameters used to communicate with one core network service may not be used to communicate with another core network service.

Accordingly, aspects of the present disclosure are directed to signaling and other mechanisms that enable UEs to establish wireless connections in a service-based network, such as a 6G network. In particular, aspects of the present disclosure are directed to signaling between UEs, network entities (e.g., distributed units (DUs)), and core network services of a service-based network architecture that enable UEs to establish and maintain connections with different services offered by the network. As such, techniques described herein may enable UEs to obtain service contexts for each respective core network service to which the UE subscribes, where the service contexts include core network service-specific communications parameters for communicating with the respective core network services.

For example, a UE may establish a connection with a DU of a network entity, and may receive control signaling indicating core network services offered by the network, as well as network addresses for each of the offered core network services. The UE may then transmit (via relay by the DU) a service request to a network address of an offered core network service, and may receive (via relay by the DU) a service context for communicating with the core network service. The UE may then communicate with the core network service (via the DU) in accordance with the service context.

In some aspects, UEs may be able to request core network services that are offered by the network. For example, UEs may be able to query a discovery service (e.g., core network discovery service) that is configured to provide a list of offered core network services that are able to be accessed by the respective querying UEs. The core network services indicated to the UE as being available may be based on the capabilities of each respective UE. Some core network services may include or depend on other network functionality services. For example, in order for a UE to subscribe/communicate with a first core network service, the UE may also be required to subscribe/communicate with a second core network service that is associated with the first core network service.

Aspects of the disclosure are initially described in the context of wireless communications systems. Additional aspects of the disclosure are described in the context of an example network architecture and an example process flow. Aspects of the disclosure are further illustrated by and described with reference to apparatus diagrams, system diagrams, and flowcharts that relate to techniques for service establishment in a service-based wireless system.

FIG. 1 illustrates an example of a wireless communications system 100 that supports techniques for service establishment in a service-based wireless system in accordance with one or more aspects of the present disclosure. The wireless communications system 100 may include one or more network entities 105, one or more UEs 115, and a service-based network 130. In some examples, the wireless communications system 100 may implement aspects of a 6G network, a 5G network (e.g., a New Radio (NR) network), a 4G network (e.g., a Long Term Evolution (LTE) network, an LTE-Advanced (LTE-A) network, an LTE-A Pro network), or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, access point, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the service-based network 130, or with one another, or both. For example, network entities 105 may communicate with the service-based network 130 via one or more backhaul communication links 120 (e.g., in accordance with an S1, N2, N3, or other interface protocol). Similarly, UEs 115 may communicate with the service-based network 130 via one or more communication links 155. In some examples, network entities 105 may communicate with one another via a backhaul communication link 120 (e.g., in accordance with an X2, Xn, or other interface protocol) either directly (e.g., directly between network entities 105) or indirectly (e.g., via a service-based network 130). In some examples, network entities 105 may communicate with one another via one or more communication links such as a fronthaul communication link 168 (e.g., between a radio unit 170 and a distributed unit 165). The backhaul communication links 120 or fronthaul communication links 168, or other communication links between network entities 105, may be or include one or more wired links (e.g., an electrical link, an optical fiber link), one or more wireless links (e.g., a radio link, a wireless optical link), among other examples or various combinations thereof.

In some examples, network entities 105 may communicate with a service platform 150 (e.g., a cloud platform) that provides one or more core network services (CN services), one or more radio access network services (RAN services), or any combinations thereof (CN/RAN services 185). The CN/RAN services may be provided via the service-based network 130, using one or more APIs. For example, one or more DU service APIs 175 may provide an interface for one or more services at a UE 115. The services at the UE 115 may correspond to one or more CN/RAN services 185 at service platform 150. For example, network service APIs 180 at service-based network 130 may interface with corresponding DU service APIs 175 at a DU 165, which interface with corresponding APIs at a UE 115 to provide service connectivity between the one or more UE 115 services and corresponding CN/RAN services 185.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, a 6G NB, or other suitable terminology). In some examples, a network entity 105 (e.g., a base station 140) may be implemented in an aggregated (e.g., monolithic, standalone) base station architecture, which may be configured to utilize a service-based architecture and provide radio access within a single network entity 105 (e.g., a single RAN node, such as a base station 140, may include a RU 170, a DU 165, and DU APIs 175 for CN/RAN services 185). An RU 170 may also be referred to as a radio head, a smart radio head, a remote radio head (RRH), a remote radio unit (RRU), or a transmission reception point (TRP).

Additionally, in some examples, one or more network entities 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), a DU 165, RU 170, a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between components (e.g., CU, DU, and RU) is flexible and may support different functionalities depending on which functions (e.g., network layer functions, protocol layer functions, baseband functions, RF functions, and any combinations thereof) are performed at a component. For example, a functional split of a protocol stack may be employed between a CU and a DU 165 such that the CU may support one or more layers of the protocol stack and the DU 165 may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). In some examples, the CU may host one or more service APIs for one or more CN/RAN services 185 via corresponding network service APIs 180 of service-based network 130. The CU may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU and a DU 165, or between a DU 165 and an RU 170 may be within a protocol layer (e.g., some functions for a protocol layer may be performed by one of a CU, a DU 165, or an RU 170, while other functions of the protocol layer are performed by a different one of the CU, the DU 165, or the RU 170). A DU 165 may be connected to one or more RUs 170 via a fronthaul communication link 168 (e.g., open fronthaul (FH) interface). In some examples, a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a service-based network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for capability indication to multiple services in a service-based wireless system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs, RUs 170, RIC, SMO).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., 4G, 5G, 6G radio access technology). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

In some deployments, multiple RANs may be accessed by one or more UEs 115 or network entities 105 such as, for example, a 6G RAT and a 5G RAT. In some examples, the 6G RAT may be associated with service-based network 130 and the 5G RAT may be associated with a 5G Core 190. The 5G core 190 may provide user authentication, access authorization, tracking, Internet Protocol (IP) connectivity, and other access, routing, or mobility functions. The 5G core 190 may be an evolved packet core (EPC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the 5G core 190. User IP packets may be transferred through the user plane entity, which may provide IP address allocation as well as other functions. The user plane entity may be connected to IP services 195 for one or more network operators. The IP services 195 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may include a packet-based network that operates using a cloud platform, such as service platform 150, that provides CN/RAN services 185. The CN/RAN services 185, in some examples, may be hosted based on a deployment topology and capabilities for service parameters associated with each service. Providing CN/RAN services 185 allows for separation of particular services (e.g., mobility, connection state management, security, paging, radio access services, quality of service (QoS) configuration and data services, UE capability management, location, messaging, among others) from transport functions (e.g., data radio bearer (DRB) and logical channel (LC) management, data service configuration, among others). Service-based functions (e.g., a message broker decouple radio network procedures from network delivery mechanisms) may allow for flexibility of some functions (e.g., layer 2 (L2) functions) to be hosted anywhere in the cloud, and may enable enhanced scalability, resiliency, elasticity, agility, reuse, visibility, automation, failover, or any combinations thereof (e.g., each service across RAN and core network may scale independently by increasing or decreasing resources allocated across functions independently). Further, efficiency may be enhanced through providing real-time link management to the RAN edge, and allowing for adaptation at the DU 165 for more efficient activation, deactivation, or selection of features based on UE conditions.

In some implementations, the wireless communications system 100 support signaling and other mechanisms that enable UEs 115 to establish wireless connections with the service-based network 130 (e.g., 6G network). In particular, aspects of the present disclosure are directed to signaling between UEs 115, network entities 105 (e.g., DUs 165), and core network services (e.g., CN/RAN services 185) of a service-based network architecture that enable UEs 115 to establish and maintain connections with different core network services (e.g., CN/RAN services 185) offered by the network. As such, techniques described herein may enable UEs 115 to obtain service contexts for each respective core network service to which the UE 115 subscribes, where the service contexts include core network service-specific communications parameters for communicating with the respective core network services.

For example, a UE 115 of the wireless communications system 100 may establish a connection with a DU 165 of a network entity 105, and may receive control signaling indicating core network services (e.g., CN/RAN services 185) offered by the network, as well as network addresses for each of the offered core network services. The UE 115 may then transmit (via relay by the DU 165) a service request to a network address of an offered core network service, and may receive (via relay by the DU 165) a service context for communicating with the core network service. The UE 115 may then communicate with the core network service (via the DU 165) in accordance with the service context.

In some aspects, UEs 115 may be able to request core network services that are offered by the network. For example, UEs 115 may be able to query a discovery service (e.g., core network discovery service) that is configured to provide a list of offered core network services that are able to be accessed by the respective querying UEs 115. The core network services indicated to the UE 115 as being available may be based on the capabilities of each respective UE 115. Some core network services may include or depend on other network functionality services. For example, in order for a UE 115 to subscribe/communicate with a first core network service, the UE 115 may also be required to subscribe/communicate with a second core network service that is associated with the first core network service.

Techniques described herein may enable UEs 115 to establish and maintain connections with (e.g., subscribe to) core network services offered by a service-based network, such as within a 6G system. In particular, techniques described herein may enable UEs 115 to acquire service contexts for each respective core network service to which the UEs 115 subscribe, where the service contexts include core network service-specific parameters for communicating with the respective core network services. By enabling UEs 115 to subscribe to multiple different core network services, aspects of the present disclosure may enable UEs 115 to establish connections with a wide variety of core network services that may be offered by different operators or entities. As such, techniques described herein may enable UEs 115 to subscribe to different core network services on an a la carte basis depending on the needs or requirements of the respective UEs 115, thereby improving customization and overall user experience at the UEs 115. Moreover, by enabling UEs 115 to subscribe to specific core network services, techniques described herein may enable UEs 115 to refrain from communicating with unneeded or unwanted core network services, thereby reducing control signaling within the network, improving resource utilization, and reducing power consumption at the UEs 115.

Figure 2:
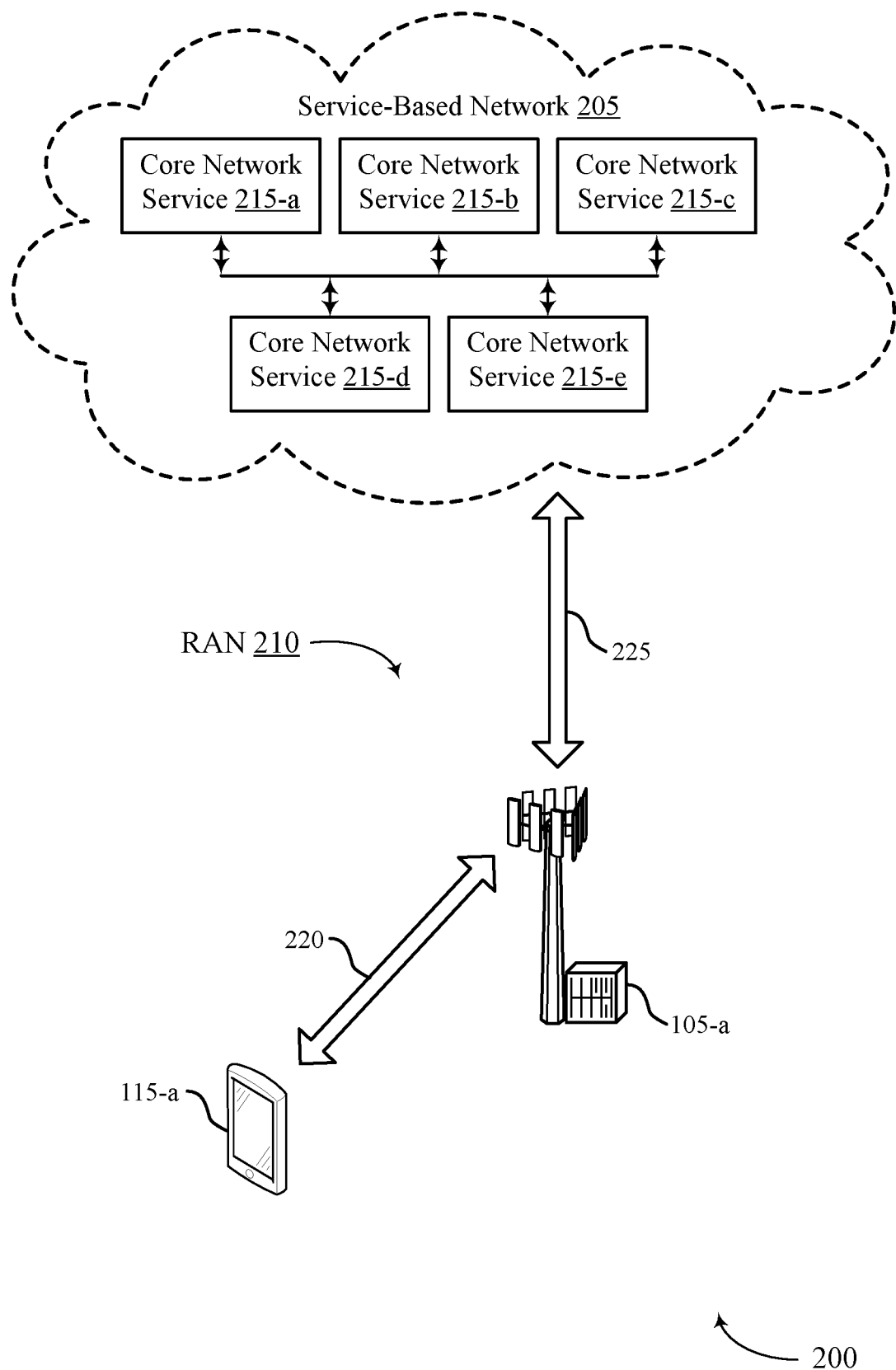
FIG. 2 illustrates an example of a wireless communications system that supports techniques for service establishment in a service-based wireless system in accordance with one or more aspects of the present disclosure.

FIG. 2 illustrates an example of a wireless communications system 200 that supports techniques for service establishment in a service-based wireless system in accordance with one or more aspects of the present disclosure. Aspects of the wireless communications system 200 may implement, or be implemented by, aspects of the wireless communications system 100. In some implementations, the wireless communications system 200 illustrates an example architecture of a service-based wireless communications system, such as a 6G network as described with reference to FIG. 1.

The wireless communications system 200 may include one or more UEs 115 (e.g., UE 115-a), one or more network entities (e.g., network entity 105-a), and a service-based network 205. In some aspects, the service-based network 205 may be configured to communicate or interface with a RAN 210 of the wireless communications system 200, where the RAN 210 includes the one or more network entities (e.g., network entity 105-a). The service-based network 205 may support or offer a set of core network services 215 (e.g., core network services 215-a, 215-b, 215-c, 215-d, 215-d, 215-e). In some implementations, the service-based network 205 may include or be associated with a cloud platform, where the respective core network services 215 are hosted at respective network addressees in the cloud platform.

The UE 115-a may communicate with the network entity 105-a using one or more communication links 220, which may include an example of an access link (e.g., a Uu link). The communication link 220 may include a bi-directional link that can include both uplink and downlink communication. Similarly, the network entity 105-a of the RAN 210 may be configured to communicate with (e.g., interface with) the service-based network 205 via one or more communication links (e.g., communication ink 225), where the communication link 215 may be configured to facilitate bi-directional communications between the network entity 105-a and each of the respective core network services 215 of the service-based network 205.

As shown in FIG. 2, the wireless communications system 200 may exhibit a service-based architecture where the entities of the RAN 210 (e.g., network entity 105-a) are configured to connect the UE 115-a to core network services 215 of the service-based network 205. In particular, the RAN 210 (e.g., network entity 105-a) may be configured to relay communications between the UE 115-a and the various core network services 215 of the service-based network to enable the UE 115-a to establish and maintain wireless connections with the respective core network services 215 in order to exchange communications associated with the various network functionalities that are supported by the respective core network services 215. In other words, the wireless communications system 200 may enable the UE 115-a to "subscribe" to the respective core network services 215 on an ala carte basis depending on the needs or requirements of the UE 115-a. In this regard, different UEs 115 within the wireless communications system 200 may be able to subscribe to different subsets of core network services 215 depending on the capabilities of the UEs 115, applications executed at the UEs 115, a mobility of the UEs 115, etc.

Each core network service 215 may be associated with a respective network address within the service-based network 205. Stated differently, each core network service 215 may be hosted at one or more components of a cloud-based network, where the components of each core network service 215 may be associated with a respective network address. The respective core network services 215 may be provided by network providers, third-party entities, etc., where each core network service 215 is configured to support a respective service or functionality offered to the components of the wireless communications system 200 (e.g., UE 115-a, network entity 105-a).

Different services, functionalities, and core network functions that may be supported or offered by the respective core network services 215 may include, but are not limited to, a mobility service, a security service, a privacy service, a location service, etc. For example, the first core network service 215-a may include a core network mobility service that that hosts information and provides signaling that facilitate the geographical movement of the UE 115-a throughout wireless communications system. By way of another example, the second core network service 215-b may include a security service that provides security and encryption services to subscribing UEs 115 within the wireless communications system 200.

In some aspects, each core network service 215 may include a respective API configured to facilitate wireless communications with the network entity 105-a and the UE 115-a, such as the network service APIs 180 illustrated in FIG. 1. APIs at the respective core network services 215 may include routing APIs, configuration APIs, or both. Routing APIs may be configured for service data unit communications between the UE 115-a and the respective core network services 215. Comparatively, configuration APIs may be configured to facilitate communications between the network entity 105-a and the respective core network services 215 to negotiate service requirements and service-specific operation.

In some aspects, the network entity 105-a (e.g., eDU) may facilitate traffic routing (e.g., service data unit routing) from the UE 115-a to the core network services 215, and vice versa. The network entity 105-a may facilitate traffic routing between the respective devices directly, via other network entities 105-a, via proxy, or any combination thereof. Moreover, in some cases, the UE 115-a may be communicatively coupled to multiple network entities 105 (e.g., dual connectivity), where the multiple network entities 105 facilitate traffic routing with the same or different sets of core network services 215. Additionally, the network entity 105-a may support service configurations or service contexts associated with communications parameters within the system, such as QoS flows, security, and UE 115 service contexts. In some aspects, the communication link 220 between the network entity 105-a and the UE 115-a may be associated with an access stratum configuration that facilitates over-the-air service awareness. The access stratum configuration may include including logical channels, access stratum security, access stratum context, and the like. For example, the access stratum configuration may be associated with a service-specific configuration (e.g., logical channels corresponding to QoS flows for each respective core network service 215) and a service-agnostic configuration (e.g., parameters which are common to all core network services 215).

The service-based wireless communications system 200 (e.g., 6G network) illustrated in FIG. 2 may exhibit several differences and advantages as compared to some other types of wireless systems, such as networks that instead exhibit a relatively more vertical, hierarchical architecture that includes many "layers" of different devices that perform functions for the network. A more hierarchical structure may result in processing and other functions being performed at multiple devices (e.g., network entity 105 and one or more back-end devices), thereby leading to inefficient use of resources and high power consumption. Additionally, the back-end architecture of a network with a more vertical, hierarchical architecture may be owned and maintained by a small handful of operators, which may render it difficult for other parties/entities to integrate with such systems, and services offered to UEs 115 and other devices may be difficult to customize within such systems.

Comparatively, service-based wireless communications system 200 illustrated in FIG. 2 exhibits a flatter, horizontal architecture which enables the respective functions of wireless communications systems to be distributed across different components (e.g., core network services 215) of the system. For example, such functions and protocols may be divided up and distributed across the set of core network services 215 such that each core network service 215 may support or enable a small portion of the capabilities and functionality of conventional wireless communications systems. In other words, the service-based architecture may enable functions and protocols to be split into self-contained services (e.g., core network services 215) as compared to components that provide all-encompassing network functions and protocols (e.g., modularization of network services/functionality across multiple core network services 215).

In this regard, the wireless communications system 200 may illustrate an example of a cloud-native platform configured to host a merger of CORE and RAN services, which may simplify protocols and reduce a duplication of processing operations across CORE and RAN (e.g., redistribution of CORE and RAN 210 services). In other words, the convergence of RAN 210 and CN functions may reduce repeated operations and functionality to serve one UE at different layers.

The wireless communications system 200 may extend benefits associated with the service-based architecture of the service-based network 205 to the RAN 210, including benefits of increased scalability, resiliency, elasticity, agility, reuse, visibility, automation, and failover. Additionally, the service-based architecture may enable each core network service 215 across RAN 210 and CORE to scale independently by increasing or decreasing resources allocated across the respective core network services 215 independently.

In some implementations, as will be described in further detail herein, the wireless communications system 200 may support signaling that enables the UE 115-*a* to establish and maintain communications with the core network services 215 of the service-based network 205, such as a 6G network. In particular, aspects of the present disclosure are directed to signaling that enables the UE 115-*a* to subscribe to core network services 215 on an ala carte basis depending on the needs or requirements of the UE 115-*a*.

Figure 3:
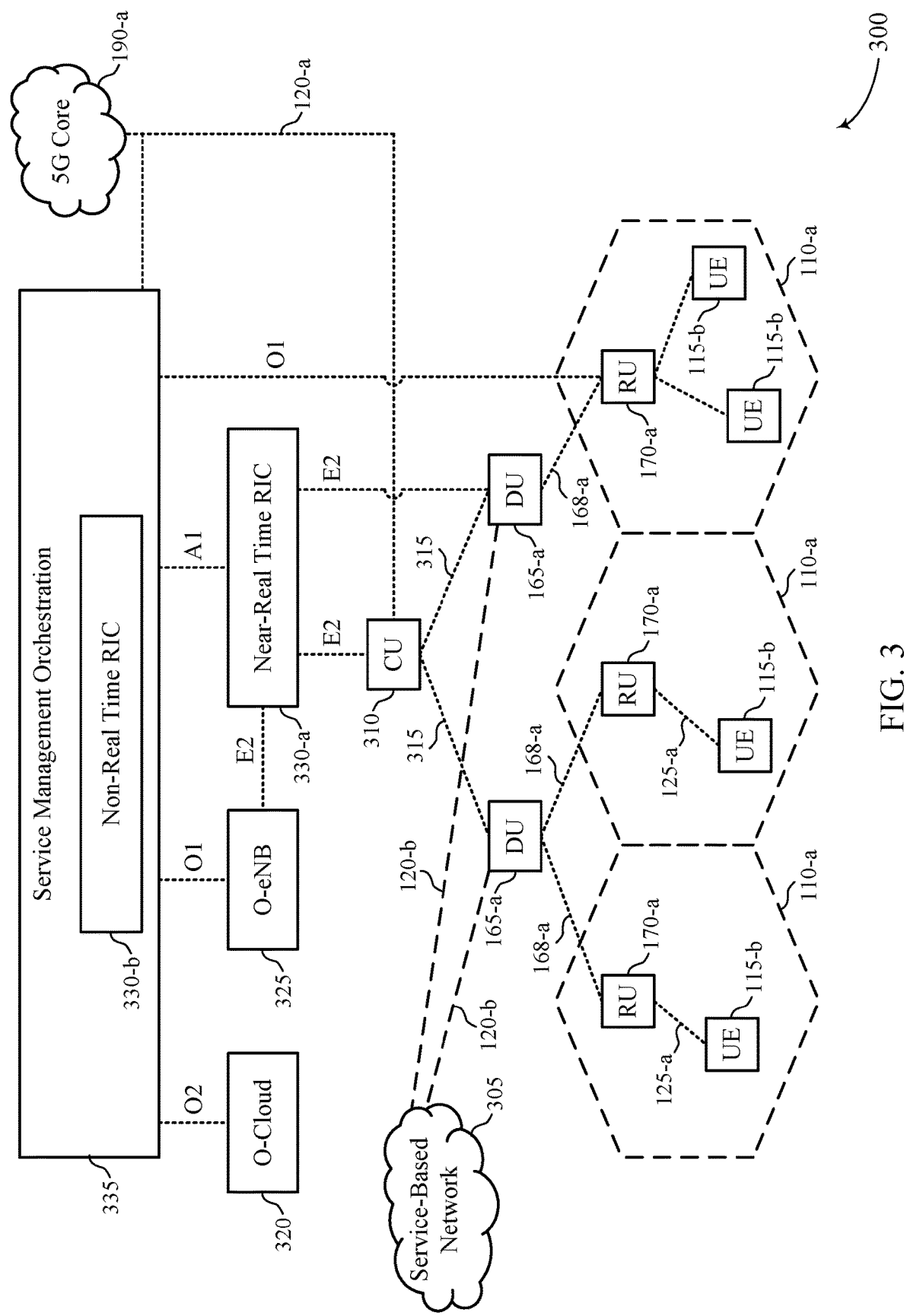
FIG. 3 illustrates an example of a network architecture that supports techniques for service establishment in a service-based wireless system in accordance with one or more aspects of the present disclosure.

FIG. 3 illustrates an example of a network architecture 300 (e.g., a disaggregated base station architecture, a disaggregated RAN architecture) that supports techniques for service establishment in a service-based wireless system in accordance with one or more aspects of the present disclosure. The network architecture 300 may illustrate an example for implementing one or more aspects of the wireless communications system 100. The network architecture 300 may include a service-based network 305, which may be an example of a service-based network 130 or 205, that communicates with DUs 165-*a* via links 120-*b*. In this example, DUs 165 may also communicate with one or more CUs 310 that may communicate directly with a 5G core 190-*a* via a backhaul communication link 120-*a*, or indirectly with the 5G core 190-*a* through one or more disaggregated network entities 105 (e.g., a Near-RT RIC 330-*a* via an E2 link, or a Non-RT RIC 330-*b* associated with an SMO 335 e.g., an SMO Framework), or both). A CU 310 may communicate with one or more DUs 165-*a* via respective midhaul communication links 315 (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*b* via one or more communication links 125-*a*. In some implementations, a UE 115-*b* may be simultaneously served by multiple RUs 170-*a*.

Each of the network entities 105 of the network architecture 300 (e.g., CUs 310, DUs 165-*a*, RUs 170-*a*, Non-RT RICs 330-*a*, Near-RT RICs 330-*b*, SMOs 335, Open Clouds (O-Clouds) 320, Open eNBs (O-eNBs) 325) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 310 may host one or more higher layer control functions. Such control functions may include RRC, PDCP, SDAP, or the like. Each control function may be implemented with an interface configured to communicate signals with other control functions hosted by the CU 310. A CU 310 may be configured to handle user plane functionality (e.g., CU-UP), control plane functionality (e.g., CU-CP), or a combination thereof. In some examples, a CU 310 may be logically split into one or more CU-UP units and one or more CU-CP units. A CU-UP unit may communicate bidirectionally with the CU-CP unit via an interface, such as an E1 interface when implemented in an O-RAN configuration. A CU 310 may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, when interfacing with service-based network 305, a DU 165-*a* may host one or more APIs for one or more services of the service-based network 305 and one or more corresponding services at one or more UEs 115-*b*. In some examples, when interfacing with CUs 310, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 310.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*b*. In some implementations, real-time and non-real-time aspects of control and user plane communication with the RU(s) 170-*a* may be controlled by the corresponding DU 165-*a*. In some examples, such a configuration may enable a DU 165-*a* and a CU 310 to be implemented in a cloud-based RAN architecture, such as a vRAN architecture.

The SMO 335 may be configured to support RAN deployment and provisioning of non-virtualized and virtualized network entities 105. For non-virtualized network entities 105, the SMO 335 may be configured to support the deployment of dedicated physical resources for RAN coverage requirements which may be managed via an operations and maintenance interface (e.g., an O1 interface). For virtualized network entities 105, the SMO 335 may be configured to interact with a cloud computing platform (e.g., an O-Cloud 320) to perform network entity life cycle management (e.g., to instantiate virtualized network entities 105) via a cloud computing platform interface (e.g., an O2 interface). Such virtualized network entities 105 can include, but are not limited to, CUs 310, DUs 165-*a*, RUs 170-*a*, and Near-RT RICs 330-a. In some implementations, the SMO 335 may communicate with components configured in accordance with a 4G RAN (e.g., via an O1 interface). Additionally, or alternatively, in some implementations, the SMO 335 may communicate directly with one or more RUs 170-a via an O1 interface. The SMO 335 also may include a Non-RT RIC 330-b configured to support functionality of the SMO 335.

The Non-RT RIC 330-b may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 330-a. The Non-RT RIC 330-b may be coupled to or communicate with (e.g., via an A1 interface) the Near-RT RIC 330-a. The Near-RT RIC 330-a may be configured to include a logical function that enables near-real-time control and optimization of RAN elements and resources via data collection and actions over an interface (e.g., via an E2 interface) connecting one or more CUs 310, one or more DUs 165-a, or both, as well as an O-eNB 325, with the Near-RT RIC 330-a.

In some examples, to generate AI/ML models to be deployed in the Near-RT RIC 330-b, the Non-RT RIC 330-b may receive parameters or external enrichment information from external servers. Such information may be utilized by the Near-RT RIC 330-a and may be received at the SMO 335 or the Non-RT RIC 330-b from non-network data sources or from network functions. In some examples, the Non-RT RIC 330-b or the Near-RT RIC 330-a may be configured to tune RAN behavior or performance. For example, the Non-RT RIC 330-b may monitor long-term trends and patterns for performance and employ AI or ML models to perform corrective actions through the SMO 335 (e.g., reconfiguration via O1) or via generation of RAN management policies (e.g., A1 policies).

In some implementations, as will be described in further detail herein, the network architecture 300 may support signaling that enables UEs 115 to establish and maintain communications with core network services of a service-based network, such as a 6G network. In particular, aspects of the present disclosure are directed to signaling between UEs 115, DUs 165, and core network services that enable the UEs 115 to subscribe to core network services on an a la carte basis depending on the needs or requirements of the respective UEs 115.

Figure 4:
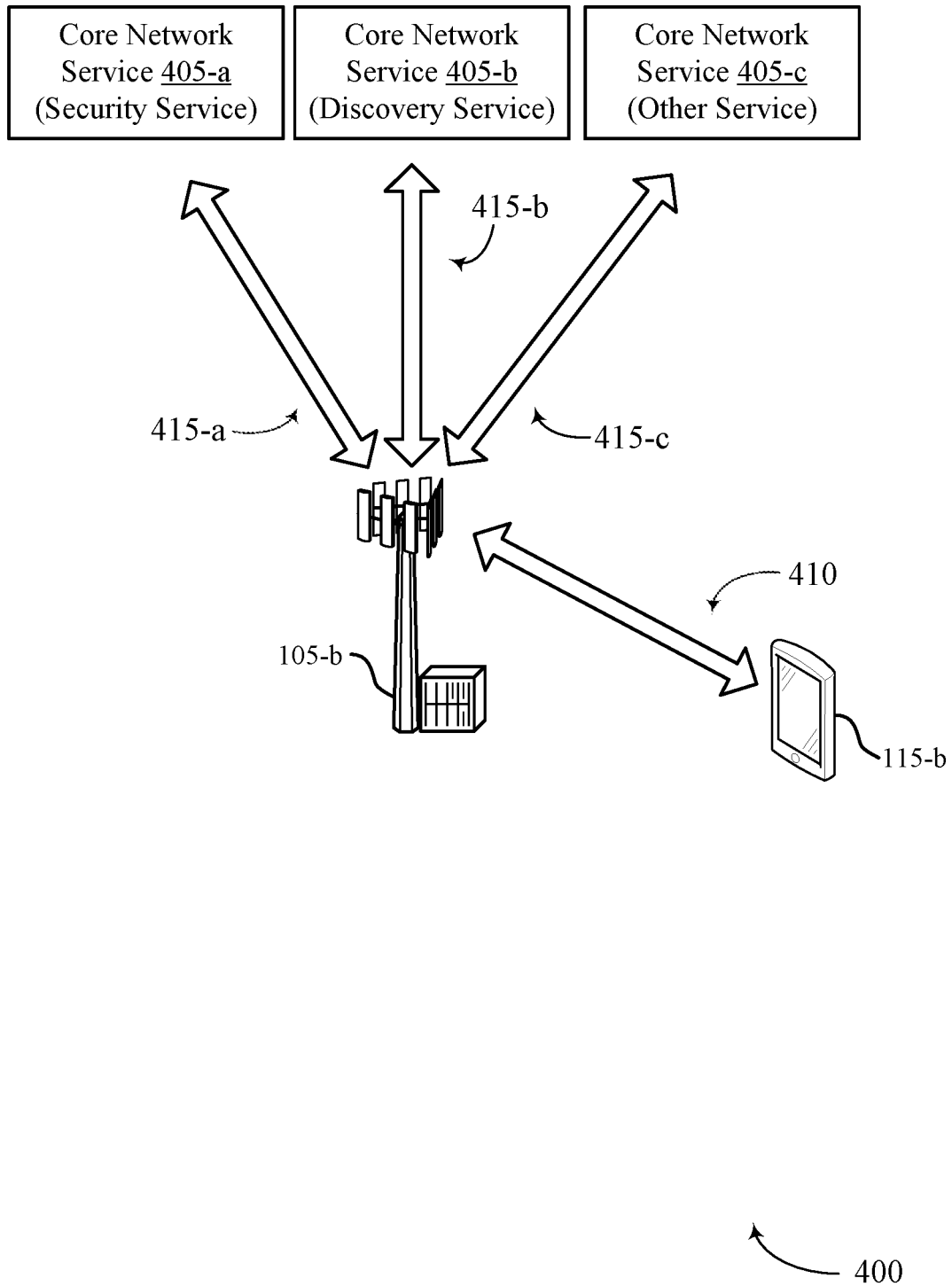
FIG. 4 illustrates an example of a wireless communications system that supports techniques for service establishment in a service-based wireless system in accordance with one or more aspects of the present disclosure.

FIG. 4 illustrates an example of a wireless communications system 400 that supports techniques for service establishment in a service-based wireless system in accordance with one or more aspects of the present disclosure. In some examples, aspects of the wireless communications system 400 may implement, or be implemented by, aspects of the wireless communications system 100, the wireless communications system 200, the network architecture 300, or any combination thereof. In particular, the wireless communications system 400 may support signaling that enables UEs 115 to establish and maintain communications with core network services of a service-based network, such as a 6G network, as described with respect to FIG. 1.

The wireless communications system 400 may include a UE 115-b, a network entity 105-b, a first core network service 405-a (e.g., a core network security service), a second core network service 405-b (e.g., core network discovery service), and a third core network service 405-c. In some implementations, the network entity 105-b may include an example of an O-RAN entity which includes multiple components, such as one or more DUs, as shown and described in FIG. 3. In this regard, the network entity 105-b illustrated in FIG. 4 may additionally or alternatively be referred to as a DU or eDU.

The core network services 405 may be associated with a service-based network, such as the service-based network 205 illustrated in FIG. 2. In some aspects, the service-based network including the core network services 405 may be configured to communicate or interface with a RAN of the wireless communications system 400, where the RAN includes the one or more network entities (e.g., network entity 105-b). In some implementations, the core network services 405 may be associated with, or hosted by, a cloud platform, where the respective core network services 405 are hosted at respective network addressees in the cloud platform.

The UE 115-b may communicate with the network entity 105-b using a communication link 410, which may be an example of an NR, LTE, or 6G link between the UE 115-b and the network entity 105-b. In some cases, the communication link 410 may include an example of an access link (e.g., Uu link) which may include a bi-directional link that enables both uplink and downlink communication. Similarly, the network entity 105-b of the RAN may be configured to communicate with (e.g., interface with) the core network services 405 of the service-based network via communication links 415-a, 415-b, and 415-c where the communication links 415 may be configured to facilitate bi-directional communications between the network entity 105-b and each of the respective core network services 405. In some aspects, each core network service 405 may include a respective API configured to facilitate wireless communications with the network entity 105-b and the UE 115-b, such as the network service APIs 180 illustrated in FIG. 1.

In some aspects, the network entity 105-b (e.g., DU, eDU) may facilitate traffic routing (e.g., service data unit routing) from the UE 115-b to the core network services 405, and vice versa. In other words, the network entity 105-b may be configured to relay communications (e.g., service messages) from the UE 115-b to the core network services 405, and vice versa. The network entity 105-b may facilitate traffic routing between the respective devices directly, via other network entities 105, via proxy, or any combination thereof.

As noted previously herein, some conventional wireless systems (e.g., 4G/5G communications systems), may exhibit a relatively vertical, hierarchical architecture that includes many "layers" of different devices that perform functions for the system. For example, a conventional wireless system may include user equipments (UEs), base stations/network entities, and numerous back-end devices such as a Mobility Management Entity (MME), a Session Management Function (SMF), and an Access & Mobility Management Function (AMF). When moving from 4G to 5G systems, the CORE/RAN functional split largely remained the same. In particular, 3G and 4G systems introduced a CORE/RAN hierarchy based on an appliance model and deployment to meet performance and security requirements of accessibility of on-site equipment, and 5G systems did not reconsider the split for cloud deployments as part of the design.

The hierarchical structure of 5G communication systems often results in processing and other functions being performed at multiple devices (e.g., duplicated processing between across the MME, AMF, and/or SMF), thereby leading to wasted resources and power consumption. Additionally, the back-end architecture of some conventional wireless systems may be owned and maintained by a small handful of operators, making it difficult for other parties/entities to integrate within the systems, and complicating the ability of the systems to offer customized services and functionality to wireless devices.

Comparatively, some wireless systems, such as 6G systems, may exhibit a flatter, service-based architecture where a RAN (e.g., network entities 105) interfaces with a service-based network in order to connect UEs to core network services maintained at various network addresses within the service-based network. In the context of a service-based system, operations and functions that are performed by a few centralized back-end components (e.g., AMF, MME, SMF) of some conventional systems may be distributed across a number of core network services that may be hosted at different network addresses, such as in a cloud architecture. In other words, 6G networks may exhibit a more cloud-native architecture, where network functions and protocols are split into self-contained services (e.g., core network services 405) as opposed to all-encompassing network functions and protocols.

The cloud-native platform or architecture of 6G systems (e.g., service-based network 205 illustrated in FIG. 2) may host a merger of CORE and RAN services, while enabling respective network functions and protocols to be operated and managed by self-contained core network services 405. The merger of CORE and RAN services can simplify protocols & reduce duplication of processing and operations across CORE and RAN. New merged services may be hosted based on the deployment topology and capabilities for each respective core network service 405.

In other words, service-based wireless systems (e.g., 6G systems) may exhibit a single cloud platform that is configured to host application, CORE, and RAN services (e.g., via multiple core network services 405). The wireless communications system 400 may extend benefits associated with the service-based architecture of the service-based network 205 to the RAN, including benefits of increased scalability, resiliency, elasticity, agility, reuse, visibility, automation, and failover. Additionally, the service-based architecture may enable each core network service 215 across RAN 210 and CORE to scale independently by increasing or decreasing resources allocated across the respective core network services 215 independently.

Moreover, service-based wireless systems, such as the wireless communications system 400, may re-factor the functional split for CORE and RAN (e.g., converged service-based CORE and RAN). In particular, 6G networks may reformat the assumptions made in the 3G/4G functional hierarchy which were based on the requirements of an appliance centric architecture in order to fully leverage cloud deployments/platforms. By doing so, cloud platforms of 6G systems may enable a redistribution of CORE and RAN services, simplify protocols, reduces functional duplication while maintaining the QoS requirements for each respective core network service 405. For example, operations and protocols which were previously performed in the context of 4G/5G systems by the AMF, CU, CP, DU, or any combination thereof, may now be performed by a multitude of core network services 405 of a service-based network, which may be hosted in a cloud platform. In some cases, cloud architectures may enable applications to share a common platform, and may enable all real-time link management to be moved to the RAN edge. For example, cloud platforms may enable adaptation at the DU to allow more efficient activation, deactivation, and selection of features based on UX requirements, and may enable configuration (e.g., RRC) and activation (e.g., MAC) of performance-sensitive features to be decoupled.

Service-based wireless systems may enable modular protocols across services (e.g., across core network services 405). More specifically, service-based wireless systems may disaggregate monolithic protocols to enable a cloud-native protocol design for the CORE, RAN and device (e.g., UE). The 3GPP defines protocols based on network-centric designs, and limits innovations by release. Monolithic protocols at CORE (e.g., NAS) and RAN (e.g., RRC) may result in a single control plane protocol defined for all control plane (C-plane) functions, where feature updates impact multiple functions, and where software of a device may be too difficult to upgrade. Comparatively, cloud-native device models may enable modular protocols to scale to long tail of verticals, where protocols may be specialized per core network service 405 and may be individually upgraded or modified. Such cloud-native device models may enable the ability to adapt across different verticals and deployment types (e.g., cloud-native CI/CD protocol upgrades), and facilitate vendor diversity per core network service 405.

The RAN-CORE C-plane protocol split provided by service-based wireless networks may enable vertical convergence of operations and protocols across the previous DU, DU, AMF, and SMF structure into multiple core network services 405. For example, NAS protocols and functions that were previously performed by the AMF (e.g., connected state (idle/connected) functions, CN paging, UE network capabilities, mobility, NAS security) may now be managed/offered by respective core network services 405 (e.g., paging service, capability service, mobility service, security service, etc.). Similarly, RRC protocols and functions that were previously performed by the CU (e.g., AS security, mobility, UE radio capability, RAN paging, connection management, SRB/DRB management, etc.) may now be managed/offered by respective core network services 405 (e.g., connection service, SRB/DRB service, etc.), by new eDU functionality, or both. Additionally, the RAN-CORE C-plane protocol split may enable a horizontal split (e.g., modularization) of different network operations and functions across multiple core network services 405.

As a result, UEs 115 in a service-based system may be able to establish and maintain connections with (e.g., "subscribe" to) different core network services 405 on an a la carte basis, where each core network service 405 offers or provides a respective network functionality or service. For example, a service-based system may include a mobility service, a security service, a privacy service, a location service, and the like. In this regard, each UE 115 within a service-based system may be able to select which core network services 405 that the UE 115 will subscribe to based on the individualized characteristics or needs of the respective UE 115.

The procedure for establishing a connection with a core network service 405 (e.g., subscribing to a core network service 405) may include several primary phases: (1) RAN connection establishment, (2) system information acquisition, (3) service establishment, (4) service execution, and (5) service release. During RAN connection establishment phase, the UE 115-*b* may establish a wireless connection with the RAN (e.g., establish a wireless connection with the network entity 105-*b*). During the system information acquisition phase, the RAN (e.g., network entity 105-*b*) may acquire information or a configuration associated with providing system information to the UE 115-*b*, and may subsequently provide the system information to the UE 115-*b*. In this regard, the UE 115-*b* may be configured to receive system information from the network entity 105-*b*, a system information service (e.g., core network system information service), or both. The system information may include information for communications with the network entity 105-b, communications with other core networks service offered by the service-based network, and the like.

The service establishment phase may include several steps of sub-phases, including: (a) security establishment, (b) service discovery, and (c) service configuration. In some aspects, the security service (e.g., first core network service 405-a) may be established as the first core network service 405 for a service group. That is, the UE 115-b may subscribe to the security service (e.g., first core network service 405-a) as part of the service establishment phase. Subsequently, during the service discovery sub-phase, the UE 115-b may identify what core network services 405 are offered/available within the system. In some cases, the network entity 105-b may indicate which core network services 405 are offered or available. Additionally, or alternatively, the UE 115-b may query the discovery service (e.g., second core network service 405-b) in order to perform service discovery. Lastly, during service configuration, the UE 115-b may transmit a service request to an offered core network service 405 (e.g., third core network service 405-c), and may receive a service context for communicating with the core network service 405. In some aspects, the service context may include service-specific parameters for communicating with the third core network service 405-c. Parameters for communicating with the third core network service 405-c which may be indicated via the service context may include a types or formats of signaling and information to be exchanged between the UE 115-b and the third core network service 405-c, resources for communications between the UE 115-b and the third core network service 405-c, HARQ procedures for communications between the UE 115-b and the third core network service 405-c, associated or related core network services 405 required for performance of the third core network service 405-c, and the like.

Subsequently, the during the service activation phase, the UE 115-b and the third core network service 405-c may activate the service at the UE 115-b (e.g., the third core network service 405-c is transitioned to an active state at the UE 115-b), and the UE 115-b and the third core network service 405-c may communicate with one another (via the network entity 105-b) in accordance with the service context. Finally, during the service deactivation phase, the third core network service 405-c may be transitioned to an inactive state at the UE 115-c (e.g., no active communications between the UE 115-b and the third core network service 405-c).

The respective phases for subscribing to a core network service 405 will be further shown and described with reference to FIG. 5.

Figure 5:
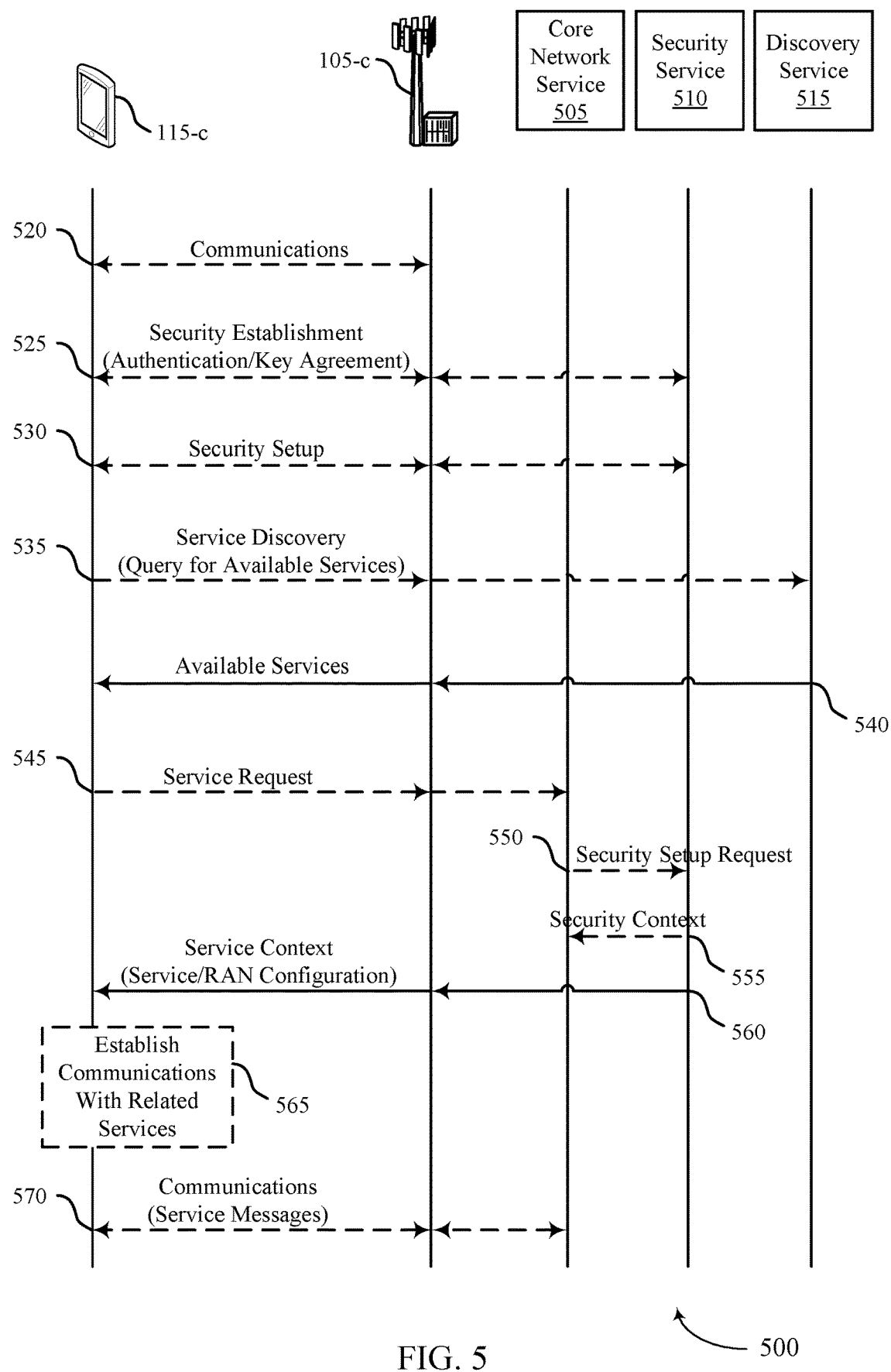
FIG. 5 illustrates an example of a process flow that supports techniques for service establishment in a service-based wireless system in accordance with one or more aspects of the present disclosure.

FIG. 5 illustrates an example of a process flow 500 that supports techniques for service establishment in a service-based wireless system in accordance with one or more aspects of the present disclosure. In some examples, aspects of the process flow 500 may implement, or be implemented by, aspects of the wireless communications system 100, the wireless communications system 200, the network architecture 300, the wireless communications system 400, or any combination thereof. In particular, the process flow 500 illustrates signaling that enables a UE 115-c to subscribe to core network services offered by a service-based network, as described with reference to FIGS. 1-4, among other aspects.

The process flow 500 may include a UE 115-c, a network entity 105-c, a core network service 505, a security service 510 (e.g., additional core network service, or core network security service), and a discovery service 515 (e.g., additional core network service, or core network discovery service), which may be examples of UEs 115, network entities 105, core network services, and other wireless devices described with reference to FIGS. 1-4. In some aspects, the security service may store information associated with security operations and protocols, and may facilitate security functions at the UE 115-c within the network. Similarly, the discovery service 515 may store information associated with core network services 505 that are offered by the service-based network, and may facilitate UE 115-c subscriptions to offered core network services 505.

In some aspects, the core network service 505, the security service 510, the discovery service 515, or any combination thereof, may be included within a set of services offered or provided by a service-based network, such as the service-based network 205 illustrated in FIG. 2. In such cases, the service-based network including the core network service 505, the security service 510, and the discovery service 515 may be configured to interface with (e.g., communicate with) a RAN including the network entity 105-c (e.g., DU, eDU) in order to facilitate communications between the service-based network and the UE 115-c. In this regard, the signaling illustrated in FIG. 5 may include example signaling within a network with a service-based architecture, such as a 6G system.

In some examples, the operations illustrated in process flow 500 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 520, the UE 115-c may establish service (e.g., establish a location connection) and perform communications with the network entity 105-c. In some aspects, the UE 115-c may perform communications with the network entity 105-c based on performance of a random access procedure with the network entity 105-c. At 520, the UE 115-c may not have established communications with any core network services 505, and may therefore not have any service context information for communicating with the respective core network services 505.

At 525, the UE 115-c may perform security service establishment with the security service 510 (e.g., core network security service). For example, the UE 115-c and the security service 510 may exchange information associated with authentication and key agreements between the respective devices. In some aspects, the UE 115-c may establish a connection with the security service 510 (e.g., subscribe to the security service 510) as the first core network service for a service group (e.g., group of related or inter-dependent core network services 505). Moreover, in some cases, the security service establishment may be performed on an existing subscription, and may reuse security setup procedures.

At 530, the UE 115-c and the security service 510 may perform security setup. The UE 115-c and the security service 510 may perform the security setup at 530 based on performing the security establishment at 525. After performing the security setup at 530, the security service 510 may be active (e.g., in an active state) at the UE 115-c. In some aspects, the network entity 105-c may be configured to relay communications between the UE 115-c and the security service 510 in order to perform the security establishment and security setup at 525 and 530.

At 535, the UE 115-c may transmit, to the network entity 105-c, the discovery service 515, or both, a query for a set of core network services that are offered/provided by a service-based network that is configured to interface with the RAN including the network entity 105-c. In other words, the UE 115-c may perform optional service discovery to determine which core network services are available to the UE 115-c.

In some aspects, the UE 115-c may transmit the request based on communicating with the network entity 105-c at 520, establishing communications with the security service 510 at 525 and 530, or any combination thereof. For example, the network entity 105-c may relay the request from the UE 115-c to the discovery service 515. By way of another example, the UE 115-c may receive a network address for the discovery service 515 from the network entity 105-c, and may transmit the query to the network address for the discovery service 515, where the network entity 105-c is configured to relay the query to the indicated network address.

In some aspects, the query may include information that enables the discovery service 515 to determine what core network services may be offered to (or accessible by) the UE 115-c. For example, in some cases, the query may include capability information associated with the UE 115-c, where the capability information may enable the discovery service 515 to determine which core network services may be accessed by the UE 115-c.

In some aspects, the UE 115-c may transmit the query for offered core network services at 535 based on determining that one or more core network services offered by a cellular network are needed to be established in order to have connectivity and access to the respective core network services. Core network services that may be offered or provided by the wireless communications system may include, but are not limited to, a mobility service, a connection state management service, the security service 510, a paging service, radio access services, QoS configuration and data services, a UE capability management service, a location service, a messaging service, and the like.

In additional or alternative implementations, information regarding available core network services 505 offered by the service-based network may be preconfigured at the UE 115-c. For example, in some implementations, a subscriber identity module (SIM) associated with the UE 115-c may be preconfigured with information associated with core network services 505 that are offered by the service-based network and/or accessible by the UE 115-c. In such cases, the UE 115-c may be configured to identify available core network services 505 without transmitting the query at 535 and/or receiving the signaling indicating the available services at 540.

At 540, the UE 115-c may receive, from the discovery service 515 (and via the network entity 105-c), control signaling that indicates a set of core network services offered by the service-based network. For example, the control signaling may indicate the core network service 505 as a service that is offered by the service-based network and/or accessible by the UE 115-c. The UE 115-c may receive the control signaling at 540 in response to the request at 535. In some aspects, the control signaling may indicate a set of network addresses associated with the set of offered core network services, where each core network service corresponds to a respective network address. Moreover, each core network service may be associated with a respective API that enables communications between the respective core network services and the UE 115-c/network entity 105-c.

In some cases, the available core network services indicated via the control signaling to 540 may be based on the capabilities or other parameters of the UE 115-c (e.g., geographical location). For example, the indicated core network services may be based on the capability information of the UE 115-c which was indicated via the service discovery query at 535. In this example, the control signaling may indicate only those core network services that the UE 115-c is able to communicate with or subscribe to, and may not indicate other core network services that are offered by the service-based network, but which the UE 115-c is unable to access to due capabilities or other restrictions (e.g., geographical location).

At 545, the UE 115-c may transmit a service request to the core network service 505, where the service request includes a first network address associated with the core network service (e.g., request to establish a service context). In other words, the UE 115-c may transmit (and the network entity 105-c may relay) the service request to the network address corresponding to the core network service 505. In this regard, the UE 115-c may transmit the service request based on receiving the control signaling indicating the offered core network services at 540. In some aspects, the UE 115-c may transmit the service request as part of a service establishment procedure (e.g., subscription procedure) between the UE 115-c and the core network service 505. In some aspects, the service request may include a request for AS security (e.g., at the MAC layer).

The service request may include a request for a radio access configuration associated with the service, and may trigger core network service-specific configurations at the RAN (e.g., network entity 105-c) and the UE 115-c, as well as a RAN reconfiguration between the RAN and the UE 115-c. Moreover, the service request may include or indicate various parameters or characteristics associated with the UE 115-c and/or the network entity 105-c, including a QoS configuration, an AS security request, and the like. In this regard, the network entity 105-c may be configured to expose one or more APIs of the network entity 105-c to the core network service 505 in order to facilitate communications between the UE 115-c and the core network service 505.

The UE 115-c may transmit service requests to each core network service 505 that is available/offered to the UE 115-c based on a number of parameters or characteristics. The determination as to which core network services 505 that the UE 115-c may subscribe to may be based on application/service layer requests, user preferences (e.g., applications executed/executable at the UE 115-c), configuration by home operator, discovery of available services in a serving network, mobility of the UE 115-c, discovery of inter-dependencies between services (e.g., data service may require mobility service and security service to be established), or any combination thereof.

In some aspects, the core network service 505 may determine whether or not the UE 115-c is authorized for the core network service 505 and/or capable of performing communications for the respective core network service 505. In some cases, such a determination may be based on capability information indicated via the request, a geographical location of the UE 115-c, or based on the core network service 505 obtaining or requesting capability information/subscription information associated with the UE 115-c from another core network service, such as a capability service (e.g., core network capability service) or a subscription service (e.g., core network subscription service). Additionally, or alternatively, the core network service 505 may determine whether or not the UE 115-c is authorized for the core network service 505 and/or capable of performing communications for the respective core network service 505 based on whether the UE 115-c has previously established a security context with the security service 510 (e.g., as shown at 525 and 530).

In some implementations, the service request may trigger the core network service 505 to communicate with (e.g., subscribe to) other core network services that may be associated with (e.g., inter-dependent with) the core network service 505. For example, the service request at 545 may cause the core network service 505 to subscribe to other services such as the security service 510, a mobility service, a capabilities service to manage UE context, or any combination thereof. Communications between core network services may be further shown and described at 550 and 555 in process flow 500.

At 550, the core network service 505 may transmit a security setup request to the security service 510. In some aspects, the service request may include a request for AS security (e.g., at the MAC layer). In particular, the core network service 505 may transmit the request at 550 based on receiving the service request from the UE 115-c at 545. In this regard, the core network service 505 may establish communications with (e.g., subscribe to) the security service 510 so that the core network service 505 may provide the corresponding service/network functionality to the UE 115-c.

Stated differently, the core network service 505 and the security service 510 may be included within a service group of related or inter-dependent core network services, where the security service 510 is required for performance of the core network service 505. Additional security may be established with one or more other core network services in a service group as needed, and may be triggered by service establishment (e.g., triggered by the service request at 545). In this regard, the core network service 505 may transmit the request to the security service 510 at 550 (and/or subscribe to other inter-dependent core network services) based on determining that the core network service 505 needs subscription information or other information associated with the UE 115-c from one or more other core network services. For instance, in cases where the core network service 505 includes a data service, the data service may obtain security context information from the security service 510 and may obtain UE 115-c mobility information from a mobility service.

At 555, the core network service 505 may receive a security context from the security service 510. The core network service 505 may receive the security context at 555 in response to the security setup request at 550. The security context may include information (e.g., communications parameters) for communications between the core network service 505 and the security service 510, for communications between the UE 115-c and the core network service 505 and/or security service 510, or both. Moreover, in some implementations, the UE 115-c may perform security setup with the security service 510 based on the security context at 555. In this regard, in some cases, the UE 115-c may perform the security establishment and security setup at 525 and 530 based on (e.g., after) the security service 510 provides the security context at 555.

At 560, the network entity 105-c may receive control signaling indicating a service context (e.g., service configuration information) for communicating with the core network service 505. The network entity 105-c may transmit a response message to the core network service 505, and may transmit (e.g., relay) the control signaling/service context to the UE 115-c. The core network service 505 may transmit the control signaling indicating the service context based on receiving the service request at 545, transmitting the service setup request at 550, receiving the security context at 555, or any combination thereof. In some aspects, the control signaling indicating the service context may additionally or alternatively include a request for the network entity 105-c to establish a context with the core network service 505 (e.g., service configuration request), and may indicate radio access requirements/parameters for the respective core network service 505, if needed.

In some aspects, the security context (e.g., service configuration request) may include information associated with communications between the UE 115-c and the core network service 505, communications between the UE 115-c and the network entity 105-c, communications between the network entity 105-c and the core network service 505, or any combination thereof. In this regard, the service context may include service-specific parameters for communicating with the core network service 505, such as types or formats of signaling and information to be exchanged with the core network service 505, resources for communications between the respective devices (e.g., resources for communications between the UE 115-c, the network entity 105-c, and the core network service 505), HARQ procedures for communications, associated or related (e.g., inter-dependent) core network services required for performance of the core network service 505, and the like. In this regard, the service context may include a RAN configuration (e.g., RAN reconfiguration) for communications between the UE 115-c and the network entity 105-c as part of communications for the core network service 505, where the network entity 105-c configures the UE 115-c locally with the respective RAN configuration/radio resource configuration.

At 565, the UE 115-c may establish connections/communications with other, related core network services. In particular, the UE 115-c may establish communications with other core network services based on receiving the service context at 560. As such, the network entity 105-c may be configured to accumulate radio access configuration requests from multiple core network services 505 requested by the UE 115-c to determine one or more radio configurations for the UE 115-c based on the accumulation of those requests from different core network service services 505.

In other words, in cases where the service context indicates that the UE 115-c is also to subscribe to other core network services 505 associated with the core network service 505 (e.g., indicates inter-dependent core network services), the UE 115-c may establish service with the other indicated core network services, as shown at 545 through 560 in process flow 500. In such cases, security establishment may be configurable per-core network service, where services including discovery may require security, and where security context may be shared across groups of inter-dependent core network services.

In some aspects, for each respective core network service 505 to which the UE 115-c subscribes, the network entity 105-c may be configured to reply to service contexts (e.g., service configuration requests) received from each core network service 505 with service configuration responses, where service configuration responses indicate respective radio configuration(s) that pertain to each respective core network service 505.

In some aspects, the UE 115-c may receive service protocol responses from each core network service 505 that the UE 115-c has requested service. Service protocol responses may indicate whether each respective service accepts or rejects the service request received from the UE 115-c. Moreover, for core network services 505 that accept the service request from the UE 115-c, the service protocol responses may indicate a service context (e.g., service configuration information) for communications with the core network service 505, as shown at 560. Further, the service configuration information included within service protocol responses may be based on the respective service requests from the UE 115-c (e.g., service request at 545), resource configuration responses received from the network entity 105-c, or both. In cases where the core network service 505 needs more information from the UE 115-c before service can be established, service protocol messages from a core network service 505 may include a request for additional information associated with the service configuration/service context, where the additional requested information may be returned via one or more additional service protocol messages from the UE 115-c.

At 570, the UE 115-c may exchange service messages with the core network service 505 in accordance with the service context. In particular, network entity 105-c may relay service messages (e.g., service protocol data units) between the UE 115-c and the core network service 505. Service messages exchanged between the UE 115-c and the core network service 505 may include identifiers associated with the UE 115-c and the core network service 505, such as the UE ID, the network address of the core network service 505, and the like. The UE 115-c may communicate with the core network service 505 at 570 based on receiving the list of available services at 540, transmitting the service request at 545, receiving the service context at 560, establishing communications with related core network services 505, or any combination thereof.

Figure 6:
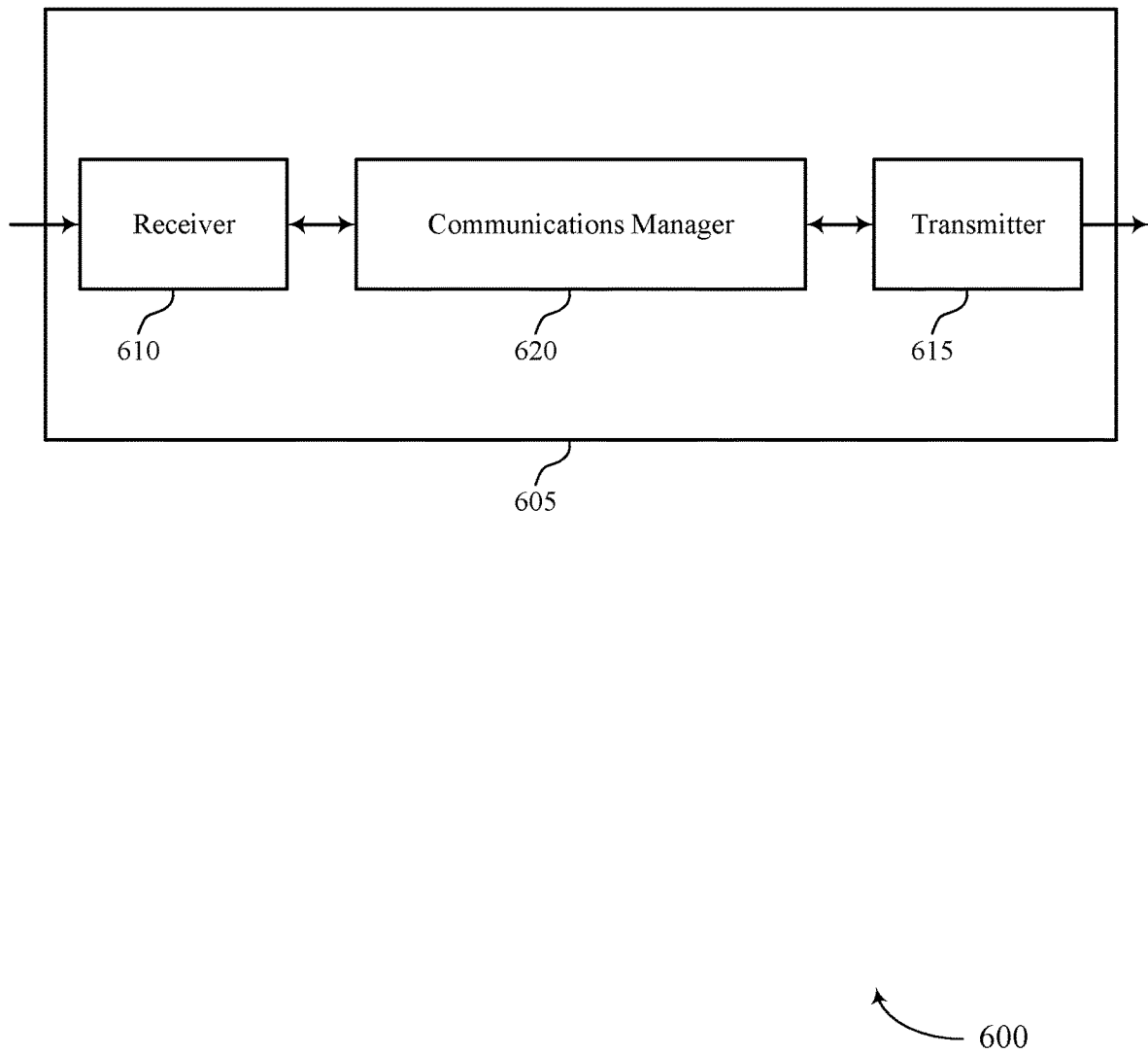
FIGS. 6 and 7 show block diagrams of devices that support techniques for service establishment in a service-based wireless system in accordance with one or more aspects of the present disclosure.

FIG. 6 shows a block diagram 600 of a device 605 that supports techniques for service establishment in a service-based wireless system in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for service establishment in a service-based wireless system). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for service establishment in a service-based wireless system). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for service establishment in a service-based wireless system as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving, via a wireless connection between the UE and a distributed unit, first control signaling indicating a set of multiple core network services offered by a service-based network configured to interface with a RAN associated with the distributed unit, the first control signaling indicating a set of multiple network addresses associated with the set of multiple core network services. The communications manager 620 may be configured as or otherwise support a means for transmitting, based on the first control signaling, a service request indicating a first core network service of the set of multiple core network services, the service request including a first network address associated with the first core network service, the set of multiple network addresses including the first network address. The communications manager 620 may be configured as or otherwise support a means for receiving second control signaling indicating a first service context for communicating with the first core network service based on the service request. The communications manager 620 may be configured as or otherwise support a means for transmitting, in accordance with the first service context, a first service message including the first network address and first service data for the first core network service.

By including or configuring the communications manager 620 in accordance with examples as described herein, the device 605 (e.g., a processor controlling or otherwise coupled with the receiver 610, the transmitter 615, the communications manager 620, or a combination thereof) may support techniques that enable UEs 115 to establish and maintain connections with (e.g., subscribe to) core network services offered by a service-based network, such as within a 6G system. In particular, techniques described herein may enable UEs 115 to acquire service contexts for each respective core network service to which the UEs 115 subscribe, where the service contexts include core network service-specific parameters for communicating with the respective core network services. By enabling UEs 115 to subscribe to multiple different core network services, aspects of the present disclosure may enable UEs 115 to establish connections with a wide variety of core network services that may be offered by different operators or entities. As such, techniques described herein may enable UEs 115 to subscribe to different core network services on an a la carte basis depending on the needs or requirements of the respective UEs 115, thereby improving customization and overall user experience at the UEs 115. Moreover, by enabling UEs 115 to subscribe to specific core network services, techniques described herein may enable UEs 115 to refrain from communicating with unneeded or unwanted core network services, thereby reducing control signaling within the network, improving resource utilization, and reducing power consumption at the UEs 115.

Figure 7:
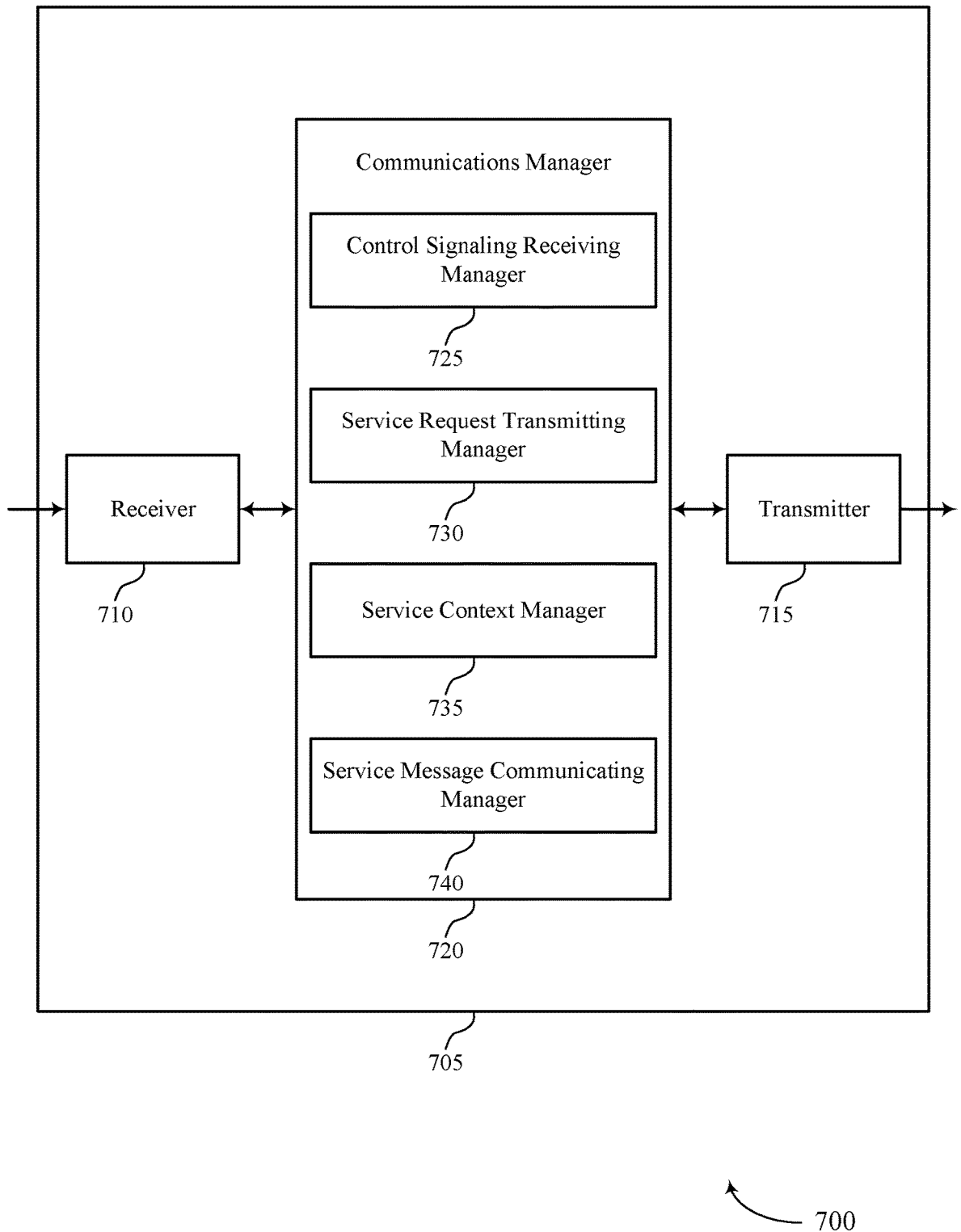

FIG. 7 shows a block diagram 700 of a device 705 that supports techniques for service establishment in a service-based wireless system in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for service establishment in a service-based wireless system). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for service establishment in a service-based wireless system). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for service establishment in a service-based wireless system as described herein. For example, the communications manager 720 may include a control signaling receiving manager 725, a service request transmitting manager 730, a service context manager 735, a service message communicating manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The control signaling receiving manager 725 may be configured as or otherwise support a means for receiving, via a wireless connection between the UE and a distributed unit, first control signaling indicating a set of multiple core network services offered by a service-based network configured to interface with a RAN associated with the distributed unit, the first control signaling indicating a set of multiple network addresses associated with the set of multiple core network services. The service request transmitting manager 730 may be configured as or otherwise support a means for transmitting, based on the first control signaling, a service request indicating a first core network service of the set of multiple core network services, the service request including a first network address associated with the first core network service, the set of multiple network addresses including the first network address. The service context manager 735 may be configured as or otherwise support a means for receiving second control signaling indicating a first service context for communicating with the first core network service based on the service request. The service message communicating manager 740 may be configured as or otherwise support a means for transmitting, in accordance with the first service context, a first service message including the first network address and first service data for the first core network service.

Figure 8:
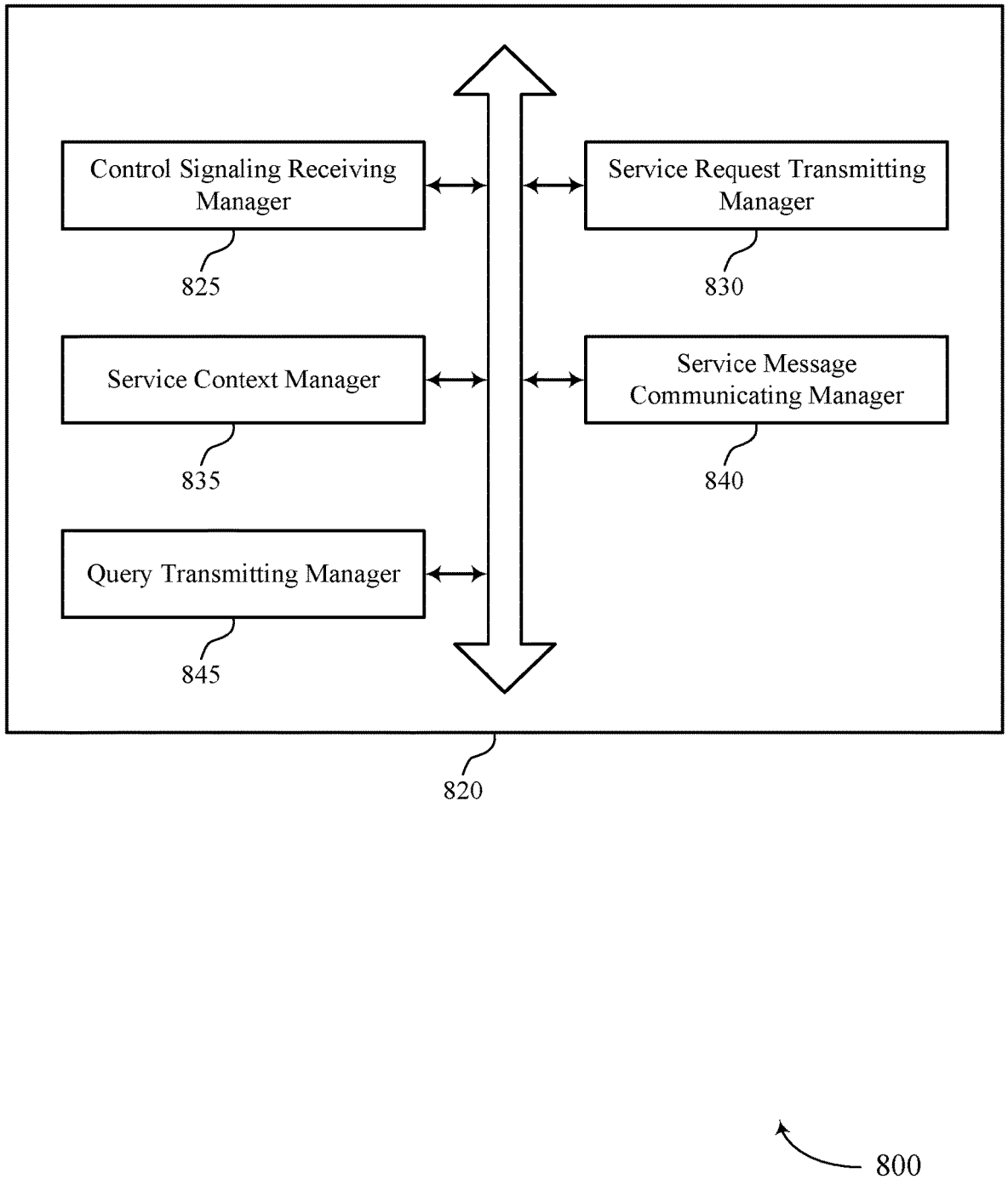
FIG. 8 shows a block diagram of a communications manager that supports techniques for service establishment in a service-based wireless system in accordance with one or more aspects of the present disclosure.

FIG. 8 shows a block diagram 800 of a communications manager 820 that supports techniques for service establishment in a service-based wireless system in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for service establishment in a service-based wireless system as described herein. For example, the communications manager 820 may include a control signaling receiving manager 825, a service request transmitting manager 830, a service context manager 835, a service message communicating manager 840, a query transmitting manager 845, or any combination thereof. Each of these components may communicate, directly or indirectly, with one another (e.g., via one or more buses).

The communications manager 820 may support wireless communication at a UE in accordance with examples as disclosed herein. The control signaling receiving manager 825 may be configured as or otherwise support a means for receiving, via a wireless connection between the UE and a distributed unit, first control signaling indicating a set of multiple core network services offered by a service-based network configured to interface with a RAN associated with the distributed unit, the first control signaling indicating a set of multiple network addresses associated with the set of multiple core network services. The service request transmitting manager 830 may be configured as or otherwise support a means for transmitting, based on the first control signaling, a service request indicating a first core network service of the set of multiple core network services, the service request including a first network address associated with the first core network service, the set of multiple network addresses including the first network address. The service context manager 835 may be configured as or otherwise support a means for receiving second control signaling indicating a first service context for communicating with the first core network service based on the service request. The service message communicating manager 840 may be configured as or otherwise support a means for transmitting, in accordance with the first service context, a first service message including the first network address and first service data for the first core network service.

In some examples, the query transmitting manager 845 may be configured as or otherwise support a means for transmitting a query for the set of multiple core network services based on establishing the wireless connection between the UE and the distributed unit, where the first control signaling is received in response to the query.

In some examples, the control signaling receiving manager 825 may be configured as or otherwise support a means for receiving, from the distributed unit, a network address associated with a core network discovery service offered by the service-based network, where the query is transmitted to the core network discovery service based on the network address.

In some examples, the query transmitting manager 845 may be configured as or otherwise support a means for transmitting, via the query, capability information associated with the UE, where the set of multiple core network services are based on the capability information.

In some examples, the service context manager 835 may be configured as or otherwise support a means for receiving, via the first service context for communicating with the first core network service, an indication of a second core network service of the set of multiple core network services. In some examples, the service request transmitting manager 830 may be configured as or otherwise support a means for transmitting a second service request indicating the second core network service, the second service request including a second network address associated with the second core network service. In some examples, the service context manager 835 may be configured as or otherwise support a means for receiving third control signaling indicating a second service context for communicating with the second core network service based on the second service request, where communicating the first service message is based on receiving the second service context.

In some examples, the service message communicating manager 840 may be configured as or otherwise support a means for communicating, in accordance with the second service context, a second service message including the second network address and second service data for the second core network service, where communicating the first service message is based on communicating the second service message.

In some examples, the second core network service includes a security service associated with the first core network service. In some examples, the second service context includes authentication information, a key agreement, or both.

In some examples, the service request, the first service message, or both, are transmitted to the distributed unit for relay to the first network address associated with the first core network service.

In some examples, the first service context includes a radio access network configuration for communicating with the distributed unit as part of the first core network service.

In some examples, each core network service of the set of multiple core network services is associated with a respective API of a set of multiple APIs.

In some examples, the set of multiple core network services include a mobility service, a connection state management service, a security service, a paging service, a radio access service, a data service, a capability management service, a location service, a messaging service, or any combination thereof.

Figure 9:
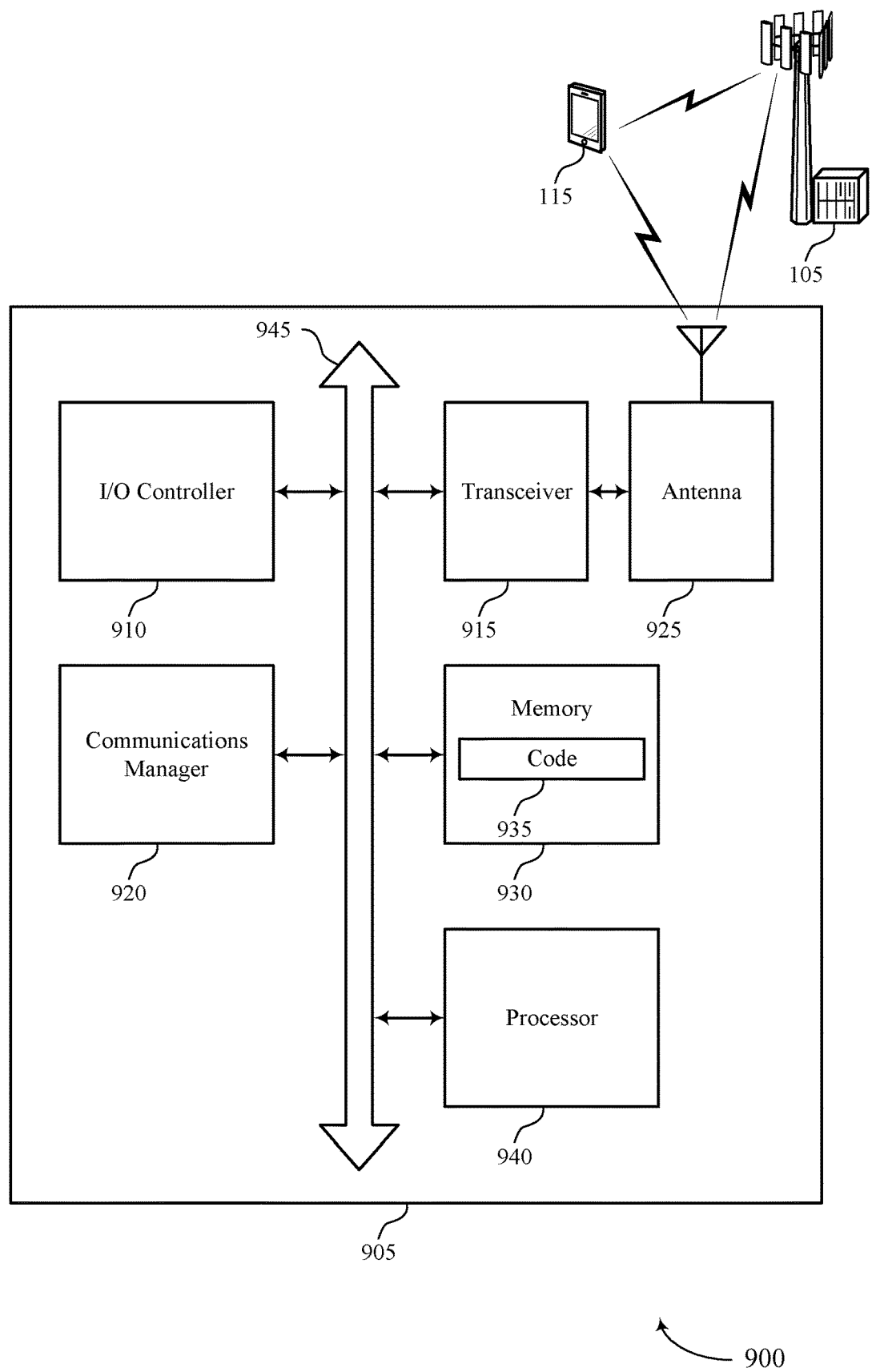
FIG. 9 shows a diagram of a system including a device that supports techniques for service establishment in a service-based wireless system in accordance with one or more aspects of the present disclosure.

FIG. 9 shows a diagram of a system 900 including a device 905 that supports techniques for service establishment in a service-based wireless system in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925.

The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for service establishment in a service-based wireless system). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, via a wireless connection between the UE and a distributed unit, first control signaling indicating a set of multiple core network services offered by a service-based network configured to interface with a RAN associated with the distributed unit, the first control signaling indicating a set of multiple network addresses associated with the set of multiple core network services. The communications manager 920 may be configured as or otherwise support a means for transmitting, based on the first control signaling, a service request indicating a first core network service of the set of multiple core network services, the service request including a first network address associated with the first core network service, the set of multiple network addresses including the first network address. The communications manager 920 may be configured as or otherwise support a means for receiving second control signaling indicating a first service context for communicating with the first core network service based on the service request. The communications manager 920 may be configured as or otherwise support a means for transmitting, in accordance with the first service context, a first service message including the first network address and first service data for the first core network service.

By including or configuring the communications manager 920 in accordance with examples as described herein, the device 905 may support techniques that enable UEs 115 to establish and maintain connections with (e.g., subscribe to) core network services offered by a service-based network, such as within a 6G system. In particular, techniques described herein may enable UEs 115 to acquire service contexts for each respective core network service to which the UEs 115 subscribe, where the service contexts include core network service-specific parameters for communicating with the respective core network services. By enabling UEs 115 to subscribe to multiple different core network services, aspects of the present disclosure may enable UEs 115 to establish connections with a wide variety of core network services that may be offered by different operators or entities. As such, techniques described herein may enable UEs 115 to subscribe to different core network services on an a la carte basis depending on the needs or requirements of the respective UEs 115, thereby improving customization and overall user experience at the UEs 115. Moreover, by enabling UEs 115 to subscribe to specific core network services, techniques described herein may enable UEs 115 to refrain from communicating with unneeded or unwanted core network services, thereby reducing control signaling within the network, improving resource utilization, and reducing power consumption at the UEs 115.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for service establishment in a service-based wireless system as described herein, or the processor 940 and the memory 930 may be otherwise configured to perform or support such operations.

Figure 10:
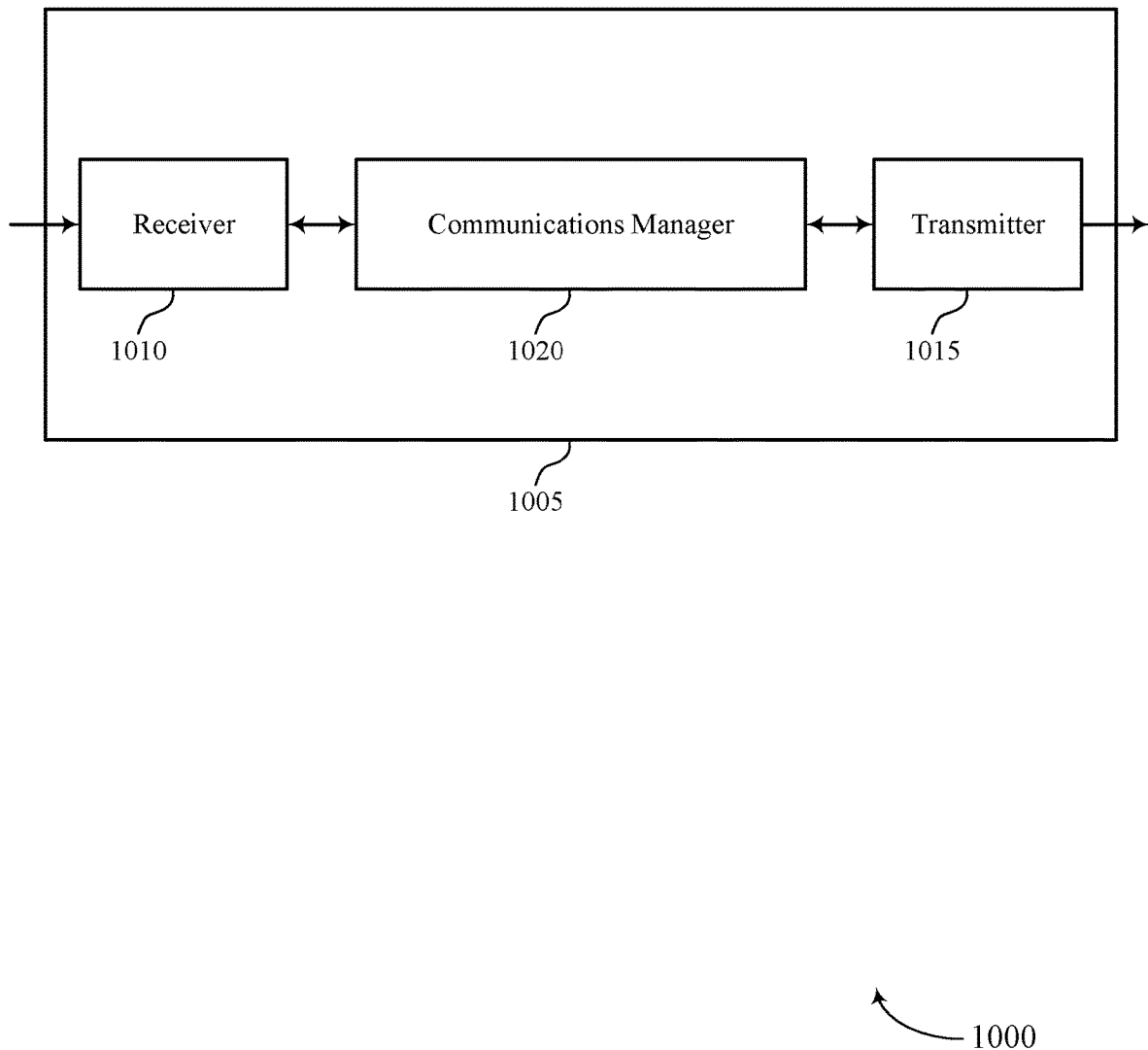
FIGS. 10 and 11 show block diagrams of devices that support techniques for service establishment in a service-based wireless system in accordance with one or more aspects of the present disclosure.

FIG. 10 shows a block diagram 1000 of a device 1005 that supports techniques for service establishment in a service-based wireless system in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for service establishment in a service-based wireless system as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a distributed unit in accordance with examples as disclosed herein. For example, the communications manager 1020 may be configured as or otherwise support a means for transmitting, to a UE, first control signaling indicating a set of multiple core network services offered by a service-based network configured to interface with a RAN associated with the distributed unit, the first control signaling indicating a set of multiple network addresses associated with the set of multiple core network services. The communications manager 1020 may be configured as or otherwise support a means for receiving, from the UE based on the first control signaling, a service request indicating a first core network service of the set of multiple core network services, the service request including a first network address associated with the first core network service, the set of multiple network addresses including the first network address. The communications manager 1020 may be configured as or otherwise support a means for transmitting the service request to the first network address. The communications manager 1020 may be configured as or otherwise support a means for transmitting, to the UE, second control signaling received from the first core network service based on the service request, the second control signaling indicating a first service context for communications between the UE and the first core network service. The communications manager 1020 may be configured as or otherwise support a means for communicating a first service message received from the UE to the first core network service in accordance with the first service context, the first service message including the first network address and first service data for the first core network service.

Additionally, or alternatively, the communications manager 1020 may support wireless communication at a first core network service in accordance with examples as disclosed herein. For example, the communications manager 1020 may be configured as or otherwise support a means for receiving, from a UE via distributed unit, a service request indicating the first core network service, the service request including a first network address associated with the first core network service, where the first core network service is included within a set of multiple core network services offered by a service-based network configured to interface with a RAN associated with the distributed unit. The communications manager 1020 may be configured as or otherwise support a means for transmitting, to the UE via the distributed unit, first control signaling indicating a first service context for communicating with the first core network service based on the service request. The communications manager 1020 may be configured as or otherwise support a means for receiving, in accordance with the first service context, a first service message including the first network address and first service data for the first core network service.

Additionally, or alternatively, the communications manager 1020 may support wireless communication at a core network discovery service in accordance with examples as disclosed herein. For example, the communications manager 1020 may be configured as or otherwise support a means for receiving, from a UE via a distributed unit, a query for a set of multiple core network services offered by a service-based network configured to interface with a RAN associated with the distributed unit. The communications manager 1020 may be configured as or otherwise support a means for transmitting, to the distributed unit for relay to a UE, first control signaling indicating the set of multiple core network services, the first control signaling indicating a set of multiple network addresses associated with the set of multiple core network services.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques that enable UEs 115 to establish and maintain connections with (e.g., subscribe to) core network services offered by a service-based network, such as within a 6G system. In particular, techniques described herein may enable UEs 115 to acquire service contexts for each respective core network service to which the UEs 115 subscribe, where the service contexts include core network service-specific parameters for communicating with the respective core network services. By enabling UEs 115 to subscribe to multiple different core network services, aspects of the present disclosure may enable UEs 115 to establish connections with a wide variety of core network services that may be offered by different operators or entities. As such, techniques described herein may enable UEs 115 to subscribe to different core network services on an a la carte basis depending on the needs or requirements of the respective UEs 115, thereby improving customization and overall user experience at the UEs 115. Moreover, by enabling UEs 115 to subscribe to specific core network services, techniques described herein may enable UEs 115 to refrain from communicating with unneeded or unwanted core network services, thereby reducing control signaling within the network, improving resource utilization, and reducing power consumption at the UEs 115.

Figure 11:
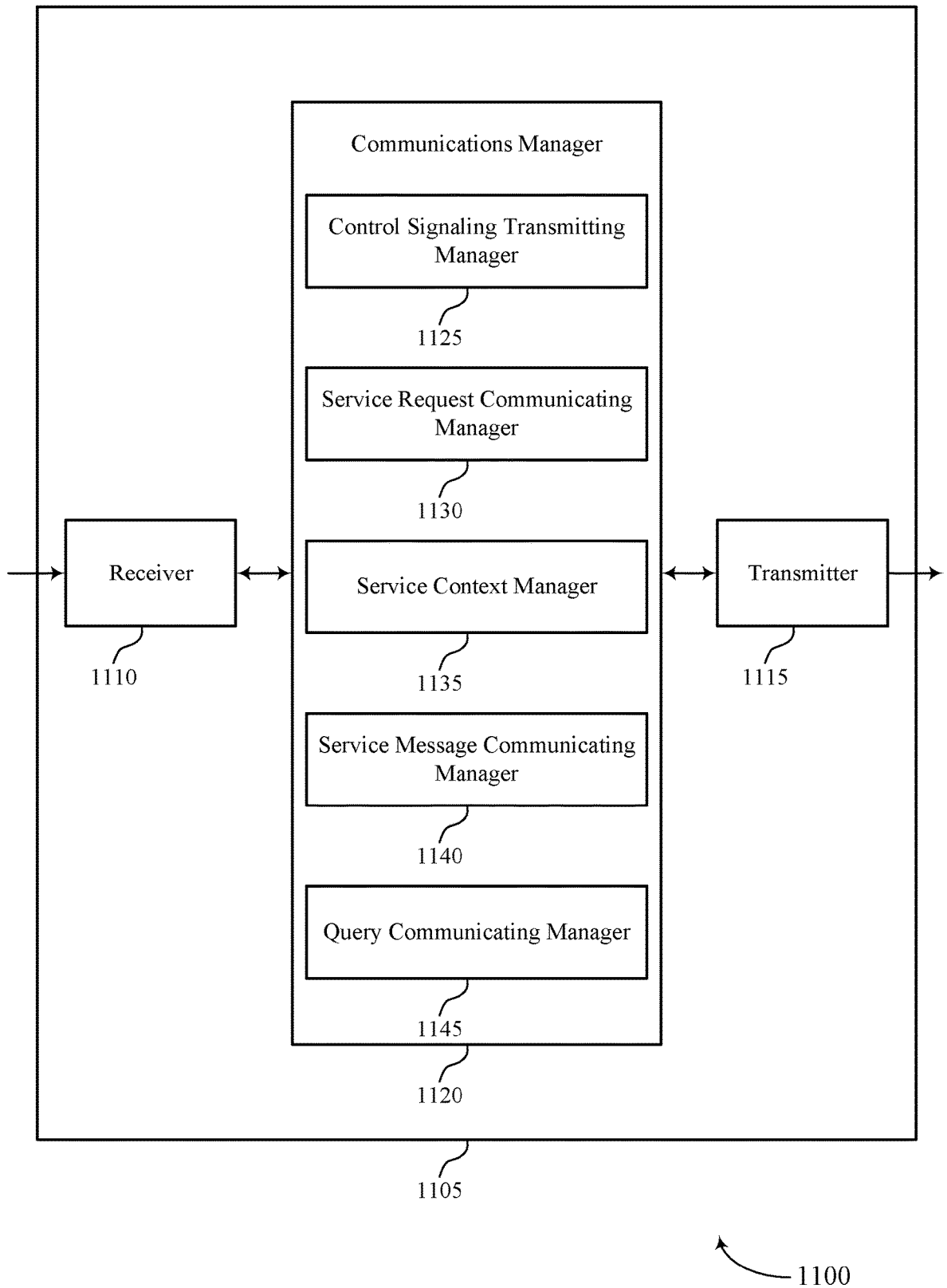

FIG. 11 shows a block diagram 1100 of a device 1105 that supports techniques for service establishment in a service-based wireless system in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for service establishment in a service-based wireless system as described herein. For example, the communications manager 1120 may include a control signaling transmitting manager 1125, a service request communicating manager 1130, a service context manager 1135, a service message communicating manager 1140, a query communicating manager 1145, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a distributed unit in accordance with examples as disclosed herein. The control signaling transmitting manager 1125 may be configured as or otherwise support a means for transmitting, to a UE, first control signaling indicating a set of multiple core network services offered by a service-based network configured to interface with a RAN associated with the distributed unit, the first control signaling indicating a set of multiple network addresses associated with the set of multiple core network services. The service request communicating manager 1130 may be configured as or otherwise support a means for receiving, from the UE based on the first control signaling, a service request indicating a first core network service of the set of multiple core network services, the service request including a first network address associated with the first core network service, the set of multiple network addresses including the first network address. The service request communicating manager 1130 may be configured as or otherwise support a means for transmitting the service request to the first network address. The service context manager 1135 may be configured as or otherwise support a means for transmitting, to the UE, second control signaling received from the first core network service based on the service request, the second control signaling indicating a first service context for communications between the UE and the first core network service. The service message communicating manager 1140 may be configured as or otherwise support a means for communicating a first service message received from the UE to the first core network service in accordance with the first service context, the first service message including the first network address and first service data for the first core network service.

Additionally, or alternatively, the communications manager 1120 may support wireless communication at a first core network service in accordance with examples as disclosed herein. The service request communicating manager 1130 may be configured as or otherwise support a means for receiving, from a UE via distributed unit, a service request indicating the first core network service, the service request including a first network address associated with the first core network service, where the first core network service is included within a set of multiple core network services offered by a service-based network configured to interface with a RAN associated with the distributed unit. The service context manager 1135 may be configured as or otherwise support a means for transmitting, to the UE via the distributed unit, first control signaling indicating a first service context for communicating with the first core network service based on the service request. The service message communicating manager 1140 may be configured as or otherwise support a means for receiving, in accordance with the first service context, a first service message including the first network address and first service data for the first core network service.

Additionally, or alternatively, the communications manager 1120 may support wireless communication at a core network discovery service in accordance with examples as disclosed herein. The query communicating manager 1145 may be configured as or otherwise support a means for receiving, from a UE via a distributed unit, a query for a set of multiple core network services offered by a service-based network configured to interface with a RAN associated with the distributed unit. The control signaling transmitting manager 1125 may be configured as or otherwise support a means for transmitting, to the distributed unit for relay to a UE, first control signaling indicating the set of multiple core network services, the first control signaling indicating a set of multiple network addresses associated with the set of multiple core network services.

Figure 12:
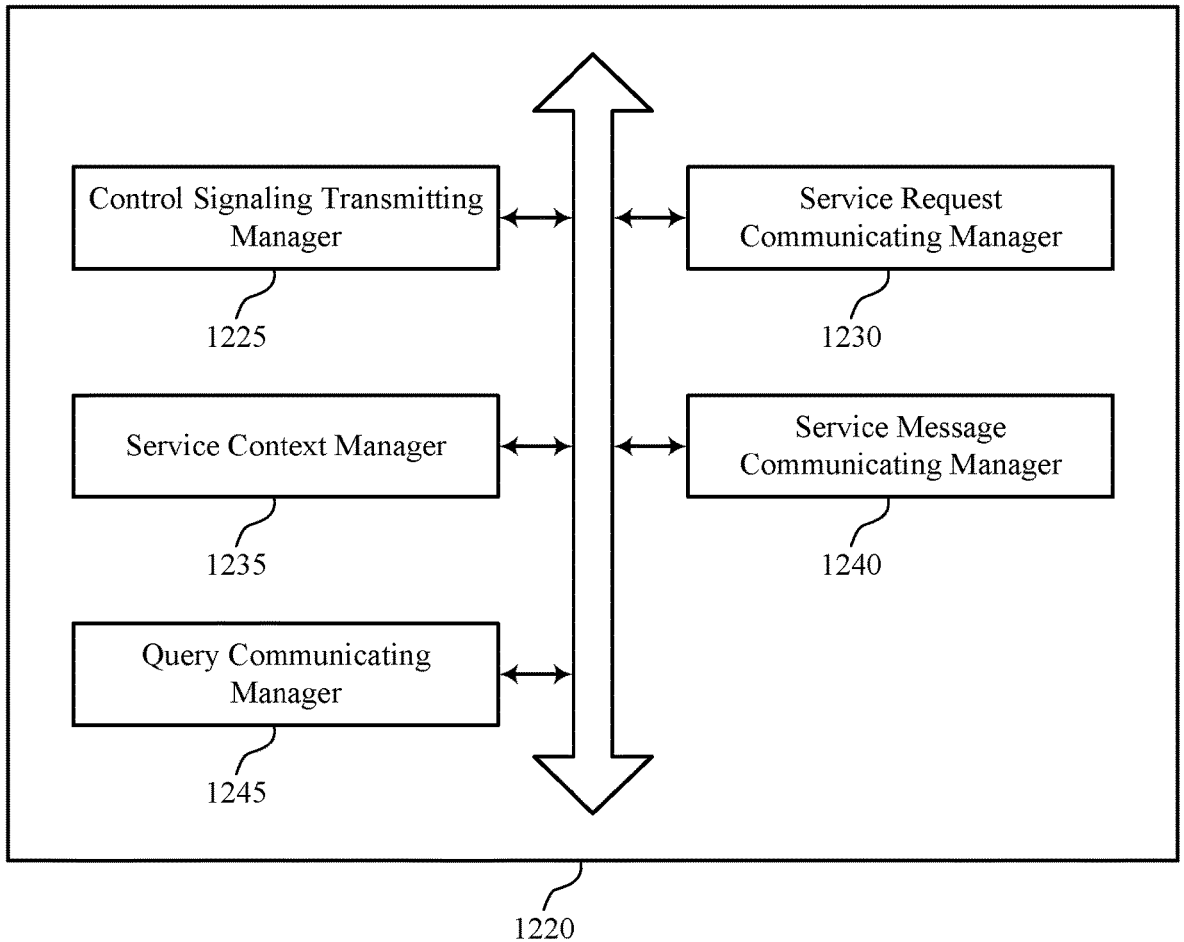
FIG. 12 shows a block diagram of a communications manager that supports techniques for service establishment in a service-based wireless system in accordance with one or more aspects of the present disclosure.

FIG. 12 shows a block diagram 1200 of a communications manager 1220 that supports techniques for service establishment in a service-based wireless system in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for service establishment in a service-based wireless system as described herein. For example, the communications manager 1220 may include a control signaling transmitting manager 1225, a service request communicating manager 1230, a service context manager 1235, a service message communicating manager 1240, a query communicating manager 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a distributed unit in accordance with examples as disclosed herein. The control signaling transmitting manager 1225 may be configured as or otherwise support a means for transmitting, to a UE, first control signaling indicating a set of multiple core network services offered by a service-based network configured to interface with a RAN associated with the distributed unit, the first control signaling indicating a set of multiple network addresses associated with the set of multiple core network services. The service request communicating manager 1230 may be configured as or otherwise support a means for receiving, from the UE based on the first control signaling, a service request indicating a first core network service of the set of multiple core network services, the service request including a first network address associated with the first core network service, the set of multiple network addresses including the first network address. In some examples, the service request communicating manager 1230 may be configured as or otherwise support a means for transmitting the service request to the first network address. The service context manager 1235 may be configured as or otherwise support a means for transmitting, to the UE, second control signaling received from the first core network service based on the service request, the second control signaling indicating a first service context for communications between the UE and the first core network service. The service message communicating manager 1240 may be configured as or otherwise support a means for communicating a first service message received from the UE to the first core network service in accordance with the first service context, the first service message including the first network address and first service data for the first core network service.

In some examples, the query communicating manager 1245 may be configured as or otherwise support a means for transmitting a query for the set of multiple core network services. In some examples, the query communicating manager 1245 may be configured as or otherwise support a means for receiving an indication of the set of multiple core network services in response to the query, where transmitting the first control signaling is based on receiving an indication of the set of multiple core network services.

In some examples, the query communicating manager 1245 may be configured as or otherwise support a means for transmitting, to the UE, a network address associated with a core network discovery service offered by the service-based network, where the query is received from the UE and transmitted to the core network discovery service based on the network address.

In some examples, the query communicating manager 1245 may be configured as or otherwise support a means for transmitting, via the query, capability information associated with the UE, where the set of multiple core network services are based on the capability information.

In some examples, the service context manager 1235 may be configured as or otherwise support a means for transmitting, via the first service context for communicating with the first core network service, an indication of a second core network service of the set of multiple core network services. In some examples, the service request communicating manager 1230 may be configured as or otherwise support a means for receiving, from the UE, a second service request indicating the second core network service, the second service request including a second network address associated with the second core network service. In some examples, the service request communicating manager 1230 may be configured as or otherwise support a means for transmitting the second service request to the second network address. In some examples, the service context manager 1235 may be configured as or otherwise support a means for transmitting, to the UE, third control signaling received from the second core network service based on the second service request, the third control signaling indicating a second service context for communications between the UE and the second core network service, where communicating the first service message is based on transmitting the second service context.

In some examples, the service message communicating manager 1240 may be configured as or otherwise support a means for communicating a second service message received from the UE to the second core network service in accordance with the second service context, the second service message including the second network address and second service data for the second core network service, where communicating the first service message is based on communicating the second service message.

In some examples, the second core network service includes a security service associated with the first core network service. In some examples, the second service context includes authentication information, a key agreement, or both.

In some examples, the first service context includes a radio access network configuration for communicating with the UE as part of the first core network service.

In some examples, each core network service of the set of multiple core network services is associated with a respective API of a set of multiple APIs.

In some examples, the set of multiple core network services include a mobility service, a connection state management service, a security service, a paging service, a radio access service, a data service, a capability management service, a location service, a messaging service, or any combination thereof.

Additionally, or alternatively, the communications manager 1220 may support wireless communication at a first core network service in accordance with examples as disclosed herein. In some examples, the service request communicating manager 1230 may be configured as or otherwise support a means for receiving, from a UE via distributed unit, a service request indicating the first core network service, the service request including a first network address associated with the first core network service, where the first core network service is included within a set of multiple core network services offered by a service-based network configured to interface with a RAN associated with the distributed unit. In some examples, the service context manager 1235 may be configured as or otherwise support a means for transmitting, to the UE via the distributed unit, first control signaling indicating a first service context for communicating with the first core network service based on the service request. In some examples, the service message communicating manager 1240 may be configured as or otherwise support a means for receiving, in accordance with the first service context, a first service message including the first network address and first service data for the first core network service.

In some examples, the service context manager 1235 may be configured as or otherwise support a means for transmitting, via the first service context for communicating with the first core network service, an indication of a second core network service of the set of multiple core network services, where receiving the first service message is based on the indication of the second core network service.

In some examples, the second core network service includes a security service associated with the first core network service.

In some examples, the first service context includes a radio access network configuration for communications between the UE and the distributed unit as part of the first core network service.

In some examples, each core network service of the set of multiple core network services is associated with a respective API of a set of multiple APIs.

In some examples, the set of multiple core network services include a mobility service, a connection state management service, a security service, a paging service, a radio access service, a data service, a capability management service, a location service, a messaging service, or any combination thereof.

Additionally, or alternatively, the communications manager 1220 may support wireless communication at a core network discovery service in accordance with examples as disclosed herein. The query communicating manager 1245 may be configured as or otherwise support a means for receiving, from a UE via a distributed unit, a query for a set of multiple core network services offered by a service-based network configured to interface with a RAN associated with the distributed unit. In some examples, the control signaling transmitting manager 1225 may be configured as or otherwise support a means for transmitting, to the distributed unit for relay to a UE, first control signaling indicating the set of multiple core network services, the first control signaling indicating a set of multiple network addresses associated with the set of multiple core network services.

In some examples, the control signaling transmitting manager 1225 may be configured as or otherwise support a means for transmitting, to the distributed unit, a network address associated with the core network discovery service offered by the service-based network, where the query is received based on the network address.

In some examples, the query communicating manager 1245 may be configured as or otherwise support a means for receiving, via the query, capability information associated with the UE, where the set of multiple core network services are based on the capability information.

In some examples, each core network service of the set of multiple core network services is associated with a respective API of a set of multiple APIs.

In some examples, the set of multiple core network services include a mobility service, a connection state management service, a security service, a paging service, a radio access service, a data service, a capability management service, a location service, a messaging service, or any combination thereof.

Figure 13:
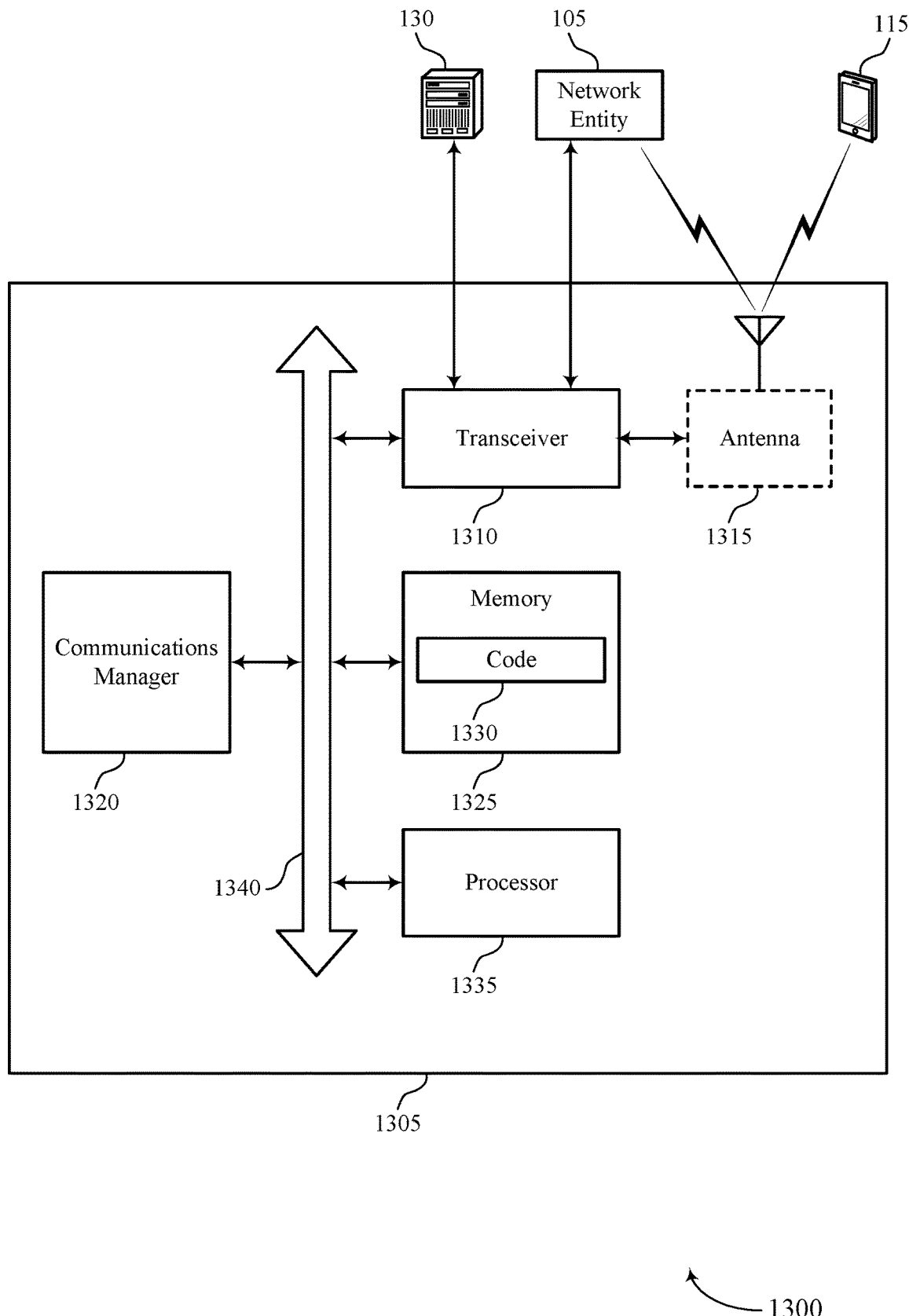
FIG. 13 shows a diagram of a system including a device that supports techniques for service establishment in a service-based wireless system in accordance with one or more aspects of the present disclosure.

FIG. 13 shows a diagram of a system 1300 including a device 1305 that supports techniques for service establishment in a service-based wireless system in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for service establishment in a service-based wireless system). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1305 may transmit information output from the chip or modem. In some implementations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a distributed unit in accordance with examples as disclosed herein. For example, the communications manager 1320 may be configured as or otherwise support a means for transmitting, to a UE, first control signaling indicating a set of multiple core network services offered by a service-based network configured to interface with a RAN associated with the distributed unit, the first control signaling indicating a set of multiple network addresses associated with the set of multiple core network services. The communications manager 1320 may be configured as or otherwise support a means for receiving, from the UE based on the first control signaling, a service request indicating a first core network service of the set of multiple core network services, the service request including a first network address associated with the first core network service, the set of multiple network addresses including the first network address. The communications manager 1320 may be configured as or otherwise support a means for transmitting the service request to the first network address. The communications manager 1320 may be configured as or otherwise support a means for transmitting, to the UE, second control signaling received from the first core network service based on the service request, the second control signaling indicating a first service context for communications between the UE and the first core network service. The communications manager 1320 may be configured as or otherwise support a means for communicating a first service message received from the UE to the first core network service in accordance with the first service context, the first service message including the first network address and first service data for the first core network service.

Additionally, or alternatively, the communications manager 1320 may support wireless communication at a first core network service in accordance with examples as disclosed herein. For example, the communications manager 1320 may be configured as or otherwise support a means for receiving, from a UE via distributed unit, a service request indicating the first core network service, the service request including a first network address associated with the first core network service, where the first core network service is included within a set of multiple core network services offered by a service-based network configured to interface with a RAN associated with the distributed unit. The communications manager 1320 may be configured as or otherwise support a means for transmitting, to the UE via the distributed unit, first control signaling indicating a first service context for communicating with the first core network service based on the service request. The communications manager 1320 may be configured as or otherwise support a means for receiving, in accordance with the first service context, a first service message including the first network address and first service data for the first core network service.

Additionally, or alternatively, the communications manager 1320 may support wireless communication at a core network discovery service in accordance with examples as disclosed herein. For example, the communications manager 1320 may be configured as or otherwise support a means for receiving, from a UE via a distributed unit, a query for a set of multiple core network services offered by a service-based network configured to interface with a RAN associated with the distributed unit. The communications manager 1320 may be configured as or otherwise support a means for transmitting, to the distributed unit for relay to a UE, first control signaling indicating the set of multiple core network services, the first control signaling indicating a set of multiple network addresses associated with the set of multiple core network services.

By including or configuring the communications manager 1320 in accordance with examples as described herein, the device 1305 may support techniques that enable UEs 115 to establish and maintain connections with (e.g., subscribe to) core network services offered by a service-based network, such as within a 6G system. In particular, techniques described herein may enable UEs 115 to acquire service contexts for each respective core network service to which the UEs 115 subscribe, where the service contexts include core network service-specific parameters for communicating with the respective core network services. By enabling UEs 115 to subscribe to multiple different core network services, aspects of the present disclosure may enable UEs 115 to establish connections with a wide variety of core network services that may be offered by different operators or entities. As such, techniques described herein may enable UEs 115 to subscribe to different core network services on an a la carte basis depending on the needs or requirements of the respective UEs 115, thereby improving customization and overall user experience at the UEs 115. Moreover, by enabling UEs 115 to subscribe to specific core network services, techniques described herein may enable UEs 115 to refrain from communicating with unneeded or unwanted core network services, thereby reducing control signaling within the network, improving resource utilization, and reducing power consumption at the UEs 115.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of techniques for service establishment in a service-based wireless system as described herein, or the processor 1335 and the memory 1325 may be otherwise configured to perform or support such operations.

Figure 14:
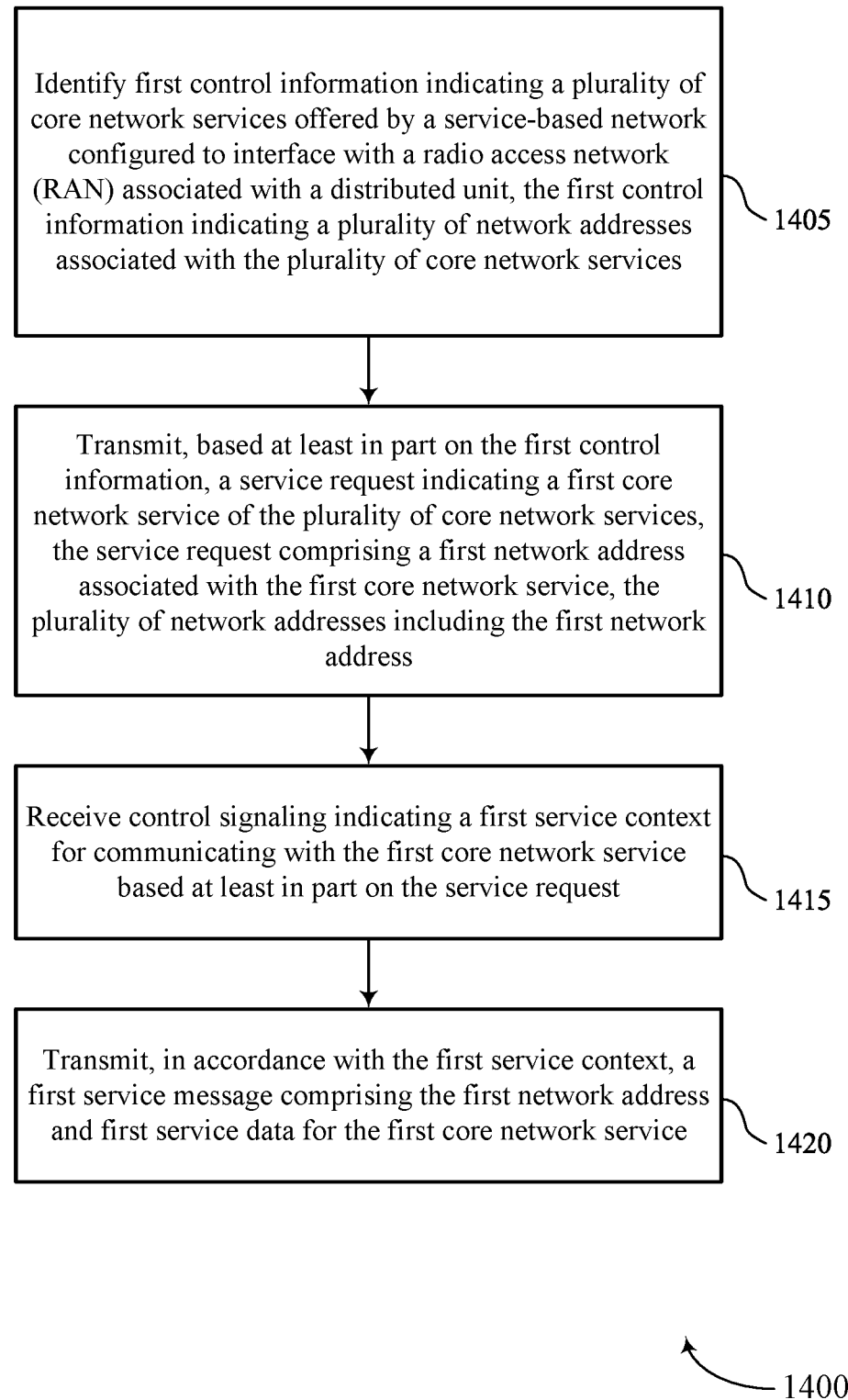
FIGS. 14 through 17 show flowcharts illustrating methods that support techniques for service establishment in a service-based wireless system in accordance with one or more aspects of the present disclosure.

FIG. 14 shows a flowchart illustrating a method 1400 that supports techniques for service establishment in a service-based wireless system in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include identifying first control information indicating a set of multiple core network services offered by a service-based network configured to interface with a RAN associated with a distributed unit, the first control information indicating a set of multiple network addresses associated with the set of multiple core network services. The operations of 1405 may be performed in accordance with examples as disclosed herein. In some examples, aspects of the operations of 1405 may be performed by a control signaling receiving manager 825 as described with reference to FIG. 8.

At 1410, the method may include transmitting, based on the first control information, a service request indicating a first core network service of the set of multiple core network services, the service request including a first network address associated with the first core network service, the set of multiple network addresses including the first network address. The operations of 1410 may be performed in accordance with examples as disclosed herein. In some examples, aspects of the operations of 1410 may be performed by a service request transmitting manager 830 as described with reference to FIG. 8.

At 1415, the method may include receiving control signaling indicating a first service context for communicating with the first core network service based on the service request. The operations of 1415 may be performed in accordance with examples as disclosed herein. In some examples, aspects of the operations of 1415 may be performed by a service context manager 835 as described with reference to FIG. 8.

At 1420, the method may include transmitting, in accordance with the first service context, a first service message including the first network address and first service data for the first core network service. The operations of 1420 may be performed in accordance with examples as disclosed herein. In some examples, aspects of the operations of 1420 may be performed by a service message communicating manager 840 as described with reference to FIG. 8.

Figure 15:
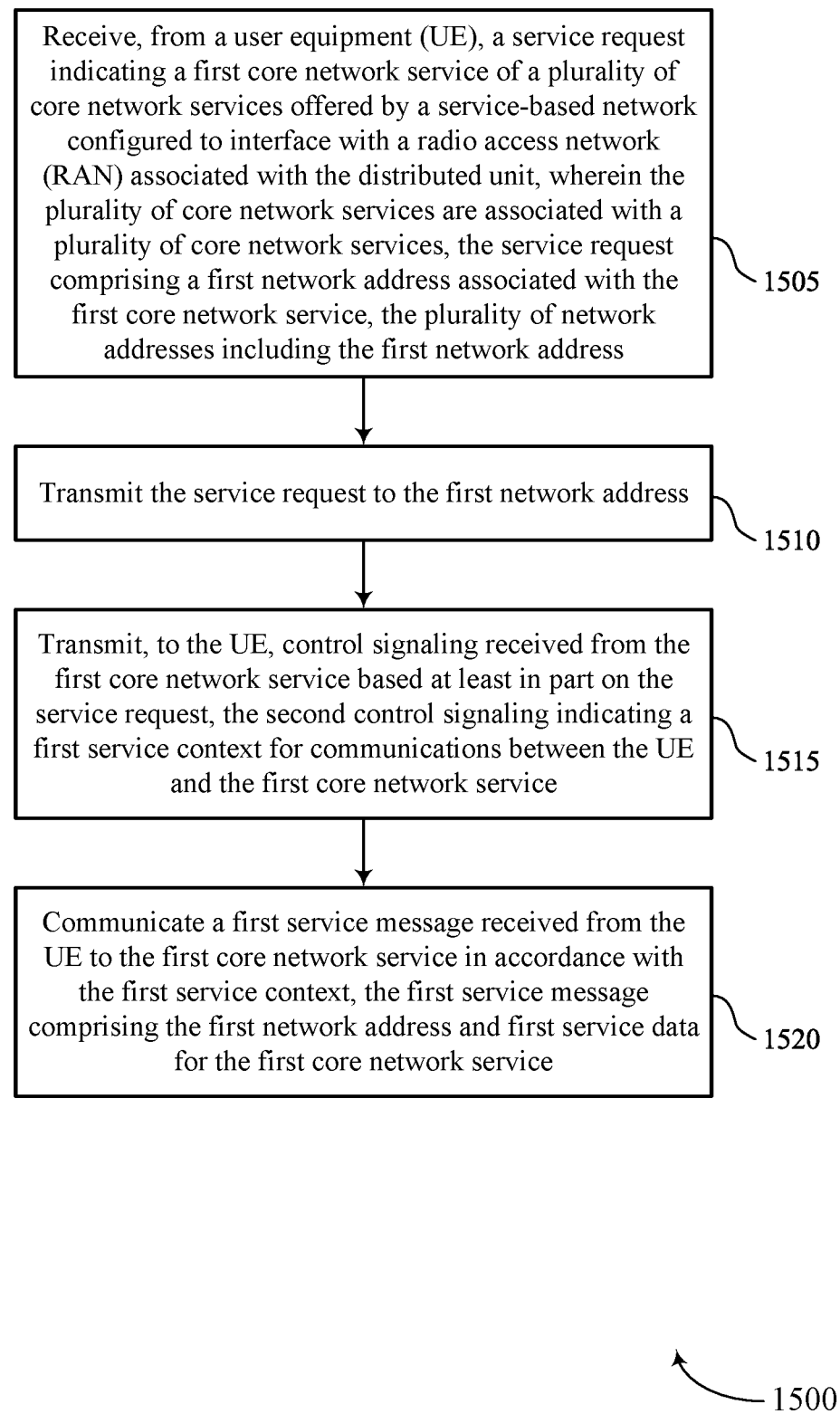

FIG. 15 shows a flowchart illustrating a method 1500 that supports techniques for service establishment in a service-based wireless system in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a UE, a service request indicating a first core network service of a set of multiple core network services offered by a service-based network configured to interface with a RAN associated with the distributed unit, wherein the plurality of core network services are associated with a plurality of core network services, the service request including a first network address associated with the first core network service, the set of multiple network addresses including the first network address. The operations of 1505 may be performed in accordance with examples as disclosed herein. In some examples, aspects of the operations of 1505 may be performed by a service request communicating manager 1230 as described with reference to FIG. 12.

At 1510, the method may include transmitting the service request to the first network address. The operations of 1510 may be performed in accordance with examples as disclosed herein. In some examples, aspects of the operations of 1510 may be performed by a service request communicating manager 1230 as described with reference to FIG. 12.

At 1515, the method may include transmitting, to the UE, second control signaling received from the first core network service based on the service request, the second control signaling indicating a first service context for communications between the UE and the first core network service. The operations of 1515 may be performed in accordance with examples as disclosed herein. In some examples, aspects of the operations of 1515 may be performed by a service context manager 1235 as described with reference to FIG. 12.

At 1520, the method may include communicating a first service message received from the UE to the first core network service in accordance with the first service context, the first service message including the first network address and first service data for the first core network service. The operations of 1520 may be performed in accordance with examples as disclosed herein. In some examples, aspects of the operations of 1520 may be performed by a service message communicating manager 1240 as described with reference to FIG. 12.

Figure 16:
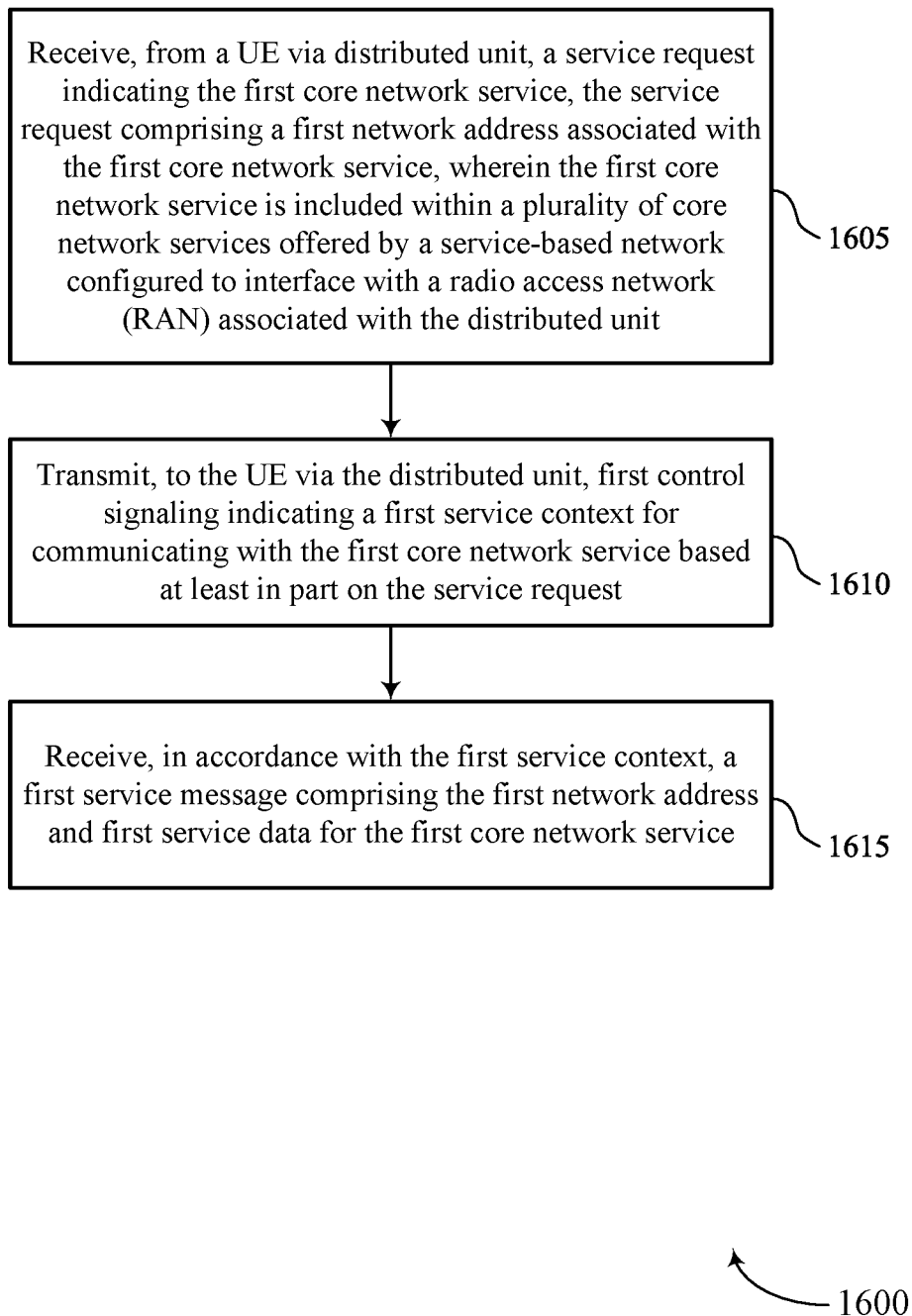

FIG. 16 shows a flowchart illustrating a method 1600 that supports techniques for service establishment in a service-based wireless system in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a UE via distributed unit, a service request indicating the first core network service, the service request including a first network address associated with the first core network service, where the first core network service is included within a set of multiple core network services offered by a service-based network configured to interface with a RAN associated with the distributed unit. The operations of 1605 may be performed in accordance with examples as disclosed herein. In some examples, aspects of the operations of 1605 may be performed by a service request communicating manager 1230 as described with reference to FIG. 12.

At 1610, the method may include transmitting, to the UE via the distributed unit, first control signaling indicating a first service context for communicating with the first core network service based on the service request. The operations of 1610 may be performed in accordance with examples as disclosed herein. In some examples, aspects of the operations of 1610 may be performed by a service context manager 1235 as described with reference to FIG. 12.

At 1615, the method may include receiving, in accordance with the first service context, a first service message including the first network address and first service data for the first core network service. The operations of 1615 may be performed in accordance with examples as disclosed herein. In some examples, aspects of the operations of 1615 may be performed by a service message communicating manager 1240 as described with reference to FIG. 12.

Figure 17:
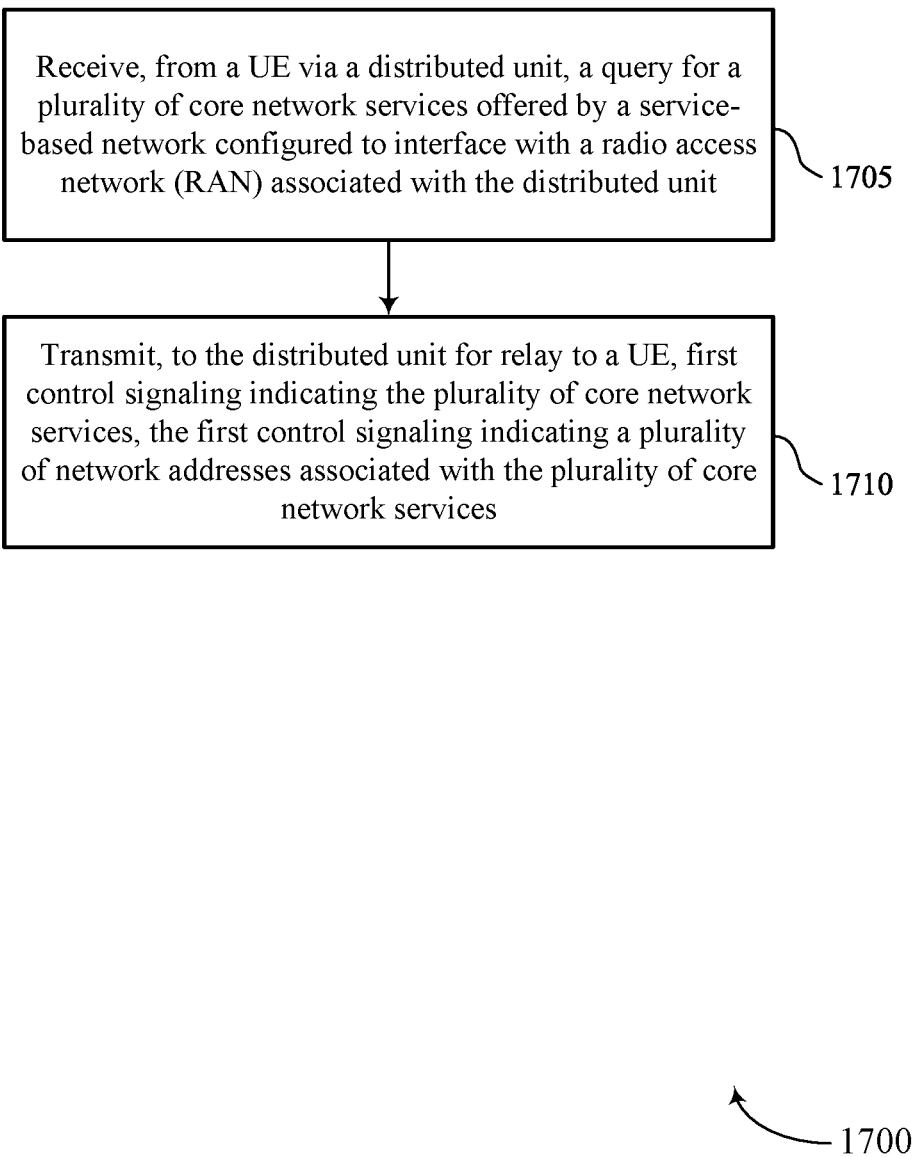

FIG. 17 shows a flowchart illustrating a method 1700 that supports techniques for service establishment in a service-based wireless system in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a UE via a distributed unit, a query for a set of multiple core network services offered by a service-based network configured to interface with a RAN associated with the distributed unit. The operations of 1705 may be performed in accordance with examples as disclosed herein. In some examples, aspects of the operations of 1705 may be performed by a query communicating manager 1245 as described with reference to FIG. 12.

At 1710, the method may include transmitting, to the distributed unit for relay to a UE, first control signaling indicating the set of multiple core network services, the first control signaling indicating a set of multiple network addresses associated with the set of multiple core network services. The operations of 1710 may be performed in accordance with examples as disclosed herein. In some examples, aspects of the operations of 1710 may be performed by a control signaling transmitting manager 1225 as described with reference to FIG. 12.

The following provides an overview of aspects of the present disclosure:

Aspect 1: A method for wireless communication at a UE, comprising: identifying first control information indicating a plurality of core network services offered by a service-based network configured to interface with a RAN associated with a DU, the first control information indicating a plurality of network addresses associated with the plurality of core network services; transmitting, based at least in part on the first control information, a service request indicating a first core network service of the plurality of core network services, the service request comprising a first network address associated with the first core network service, the plurality of network addresses including the first network address; receiving control signaling indicating a first service context for communicating with the first core network service based at least in part on the service request; and transmitting, in accordance with the first service context, a first service message comprising the first network address and first service data for the first core network service.

Aspect 2: The method of aspect 1, further comprising: transmitting a query for the plurality of core network services based at least in part on establishing a wireless connection between the UE and the DU; and receiving the first control information in response to the query.

Aspect 3: The method of aspect 2, further comprising: receiving, from the DU, a network address associated with a core network discovery service offered by the service-based network, wherein the query is transmitted to the core network discovery service based at least in part on the network address.

Aspect 4: The method of any of aspects 2 through 3, further comprising: transmitting, via the query, capability information associated with the UE, wherein the plurality of core network services are based at least in part on the capability information.

Aspect 5: The method of any of aspects 1 through 4, further comprising: receiving, via the first service context for communicating with the first core network service, an indication of a second core network service of the plurality of core network services; transmitting a second service request indicating the second core network service, the second service request comprising a second network address associated with the second core network service; and receiving third control signaling indicating a second service context for communicating with the second core network service based at least in part on the second service request, wherein communicating the first service message is based at least in part on receiving the second service context.

Aspect 6: The method of aspect 5, further comprising: communicating, in accordance with the second service context, a second service message comprising the second network address and second service data for the second core network service, wherein communicating the first service message is based at least in part on communicating the second service message.

Aspect 7: The method of any of aspects 5 through 6, wherein the second core network service comprises a security service associated with the first core network service, the second service context comprises authentication information, a key agreement, or both.

Aspect 8: The method of any of aspects 1 through 7, wherein the service request, the first service message, or both, are transmitted to the DU for relay to the first network address associated with the first core network service.

Aspect 9: The method of any of aspects 1 through 8, wherein the first service context comprises a radio access network configuration for communicating with the DU as part of the first core network service.

Aspect 10: The method of any of aspects 1 through 9, further comprising: receiving additional control signaling comprising the first control information via a wireless connection between the UE and the DU.

Aspect 11: The method of any of aspects 1 through 10, wherein the first control information is identified based at least in part on a SIM associated with the UE.

Aspect 12: The method of any of aspects 1 through 11, wherein each core network service of the plurality of core network services is associated with a respective API of a plurality of APIs.

Aspect 13: The method of any of aspects 1 through 12, wherein the plurality of core network services comprise a mobility service, a connection state management service, a security service, a paging service, a radio access service, a data service, a capability management service, a location service, a messaging service, or any combination thereof.

Aspect 14: A method for wireless communication at a DU, comprising: receiving, from a UE, a service request indicating a first core network service of a plurality of core network services offered by a service-based network configured to interface with a RAN associated with the DU, wherein the plurality of core network services are associated with a plurality network addresses, the service request comprising a first network address associated with the first core network service, the plurality of network addresses including the first network address; transmitting the service request to the first network address; transmitting, to the UE, control signaling received from the first core network service based at least in part on the service request, the control signaling indicating a first service context for communications between the UE and the first core network service; and communicating a first service message received from the UE to the first core network service in accordance with the first service context, the first service message comprising the first network address and first service data for the first core network service.

Aspect 15: The method of aspect 14, further comprising: transmitting, to the UE, second control signaling indicating the plurality of core network services offered by the service-based network, the second control signaling indicating the plurality of network addresses associated with the plurality of core network services, wherein receiving the service request is based at least in part on transmitting the second control signaling.

Aspect 16: The method of any of aspects 14 through 15, further comprising: transmitting a query for the plurality of core network services; and receiving an indication of the plurality of core network services in response to the query, wherein transmitting the control signaling is based at least in part on receiving an indication of the plurality of core network services.

Aspect 17: The method of aspect 16, further comprising: transmitting, to the UE, a network address associated with a core network discovery service offered by the service-based network, wherein the query is received from the UE and transmitted to the core network discovery service based at least in part on the network address.

Aspect 18: The method of any of aspects 16 through 17, further comprising: transmitting, via the query, capability information associated with the UE, wherein the plurality of core network services are based at least in part on the capability information.

Aspect 19: The method of any of aspects 14 through 18, further comprising: transmitting, via the first service context for communicating with the first core network service, an indication of a second core network service of the plurality of core network services; receiving, from the UE, a second service request indicating the second core network service, the second service request comprising a second network address associated with the second core network service; transmitting the second service request to the second network address; and transmitting, to the UE, second control signaling received from the second core network service based at least in part on the second service request, the second control signaling indicating a second service context for communications between the UE and the second core network service, wherein communicating the first service message is based at least in part on transmitting the second service context.

Aspect 20: The method of aspect 19, further comprising: communicating a second service message received from the UE to the second core network service in accordance with the second service context, the second service message comprising the second network address and second service data for the second core network service, wherein communicating the first service message is based at least in part on communicating the second service message.

Aspect 21: The method of any of aspects 19 through 20, wherein the second core network service comprises a security service associated with the first core network service, the second service context comprises authentication information, a key agreement, or both.

Aspect 22: The method of any of aspects 14 through 21, wherein the first service context comprises a radio access network configuration for communicating with the UE as part of the first core network service.

Aspect 23: The method of any of aspects 14 through 22, wherein each core network service of the plurality of core network services is associated with a respective API of a plurality of APIs.

Aspect 24: The method of any of aspects 14 through 23, wherein the plurality of core network services comprise a mobility service, a connection state management service, a security service, a paging service, a radio access service, a data service, a capability management service, a location service, a messaging service, or any combination thereof.

Aspect 25: A method for wireless communication at a first core network service, comprising: receiving, from a UE via a DU, a service request indicating the first core network service, the service request comprising a first network address associated with the first core network service, wherein the first core network service is included within a plurality of core network services offered by a service-based network configured to interface with a RAN associated with the DU, transmitting, to the UE via the DU, first control signaling indicating a first service context for communicating with the first core network service based at least in part on the service request; and receiving, in accordance with the first service context, a first service message comprising the first network address and first service data for the first core network service.

Aspect 26: The method of aspect 25, further comprising: transmitting, via the first service context for communicating with the first core network service, an indication of a second core network service of the plurality of core network services, wherein receiving the first service message is based at least in part on the indication of the second core network service.

Aspect 27: The method of aspect 26, wherein the second core network service comprises a security service associated with the first core network service.

Aspect 28: The method of any of aspects 25 through 27, wherein the first service context comprises a radio access network configuration for communications between the UE and the DU as part of the first core network service.

Aspect 29: The method of any of aspects 25 through 28, wherein each core network service of the plurality of core network services is associated with a respective API of a plurality of APIs.

Aspect 30: The method of any of aspects 25 through 29, wherein the plurality of core network services comprise a mobility service, a connection state management service, a security service, a paging service, a radio access service, a data service, a capability management service, a location service, a messaging service, or any combination thereof.

Aspect 31: A method for wireless communication at a core network discovery service, comprising: receiving, from a UE via a DU, a query for a plurality of core network services offered by a service-based network configured to interface with a RAN associated with the DU; and transmitting, to the DU for relay to a UE, first control signaling indicating the plurality of core network services, the first control signaling indicating a plurality of network addresses associated with the plurality of core network services.

Aspect 32: The method of aspect 31, further comprising: transmitting, to the DU, a network address associated with the core network discovery service offered by the service-based network, wherein the query is received based at least in part on the network address.

Aspect 33: The method of any of aspects 31 through 32, further comprising: receiving, via the query, capability information associated with the UE, wherein the plurality of core network services are based at least in part on the capability information.

Aspect 34: The method of any of aspects 31 through 33, wherein each core network service of the plurality of core network services is associated with a respective API of a plurality of APIs.

Aspect 35: The method of any of aspects 31 through 34, wherein the plurality of core network services comprise a mobility service, a connection state management service, a security service, a paging service, a radio access service, a data service, a capability management service, a location service, a messaging service, or any combination thereof.

Aspect 36: An apparatus for wireless communication at a UE, comprising a processor; memory coupled with the processor; and instructions stored in the memory and executable by the processor to cause the apparatus to perform a method of any of aspects 1 through 13.

Aspect 37: An apparatus for wireless communication at a UE, comprising at least one means for performing a method of any of aspects 1 through 13.

Aspect 38: A non-transitory computer-readable medium storing code for wireless communication at a UE, the code comprising instructions executable by a processor to perform a method of any of aspects 1 through 13.

Aspect 39: An apparatus for wireless communication at a DU, comprising a processor; memory coupled with the processor; and instructions stored in the memory and executable by the processor to cause the apparatus to perform a method of any of aspects 14 through 24.

Aspect 40: An apparatus for wireless communication at a DU, comprising at least one means for performing a method of any of aspects 14 through 24.

Aspect 41: A non-transitory computer-readable medium storing code for wireless communication at a DU, the code comprising instructions executable by a processor to perform a method of any of aspects 14 through 24.

Aspect 42: An apparatus for wireless communication at a first core network service, comprising a processor; memory coupled with the processor; and instructions stored in the memory and executable by the processor to cause the apparatus to perform a method of any of aspects 25 through 30.

Aspect 43: An apparatus for wireless communication at a first core network service, comprising at least one means for performing a method of any of aspects 25 through 30.

Aspect 44: A non-transitory computer-readable medium storing code for wireless communication at a first core network service, the code comprising instructions executable by a processor to perform a method of any of aspects 25 through 30.

Aspect 45: An apparatus for wireless communication at a core network discovery service, comprising a processor; memory coupled with the processor; and instructions stored in the memory and executable by the processor to cause the apparatus to perform a method of any of aspects 31 through 35.

Aspect 46: An apparatus for wireless communication at a core network discovery service, comprising at least one means for performing a method of any of aspects 31 through 35.

Aspect 47: A non-transitory computer-readable medium storing code for wireless communication at a core network discovery service, the code comprising instructions executable by a processor to perform a method of any of aspects 31 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers.

Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   identifying first control information indicating a plurality of core network services offered by a service-based network configured to interface with a radio access network (RAN) associated with a distributed unit, the first control information indicating a plurality of network addresses associated with the plurality of core network services;
   transmitting, based at least in part on the first control information, a service request indicating a first core network service of the plurality of core network services, the service request comprising a first network address associated with the first core network service, the plurality of network addresses including the first network address;
   receiving control signaling indicating a first service context for communicating with the first core network service based at least in part on the service request; and
   transmitting, in accordance with the first service context, a first service message comprising the first network address and first service data for the first core network service.

2. The method of claim 1, further comprising:
   transmitting a query for the plurality of core network services based at least in part on establishing a wireless connection between the UE and the distributed unit; and
   receiving the first control information in response to the query.

3. The method of claim 2, further comprising:
   receiving, from the distributed unit, a network address associated with a core network discovery service offered by the service-based network, wherein the query is transmitted to the core network discovery service based at least in part on the network address.

4. The method of claim 2, further comprising:
   transmitting, via the query, capability information associated with the UE, wherein the plurality of core network services are based at least in part on the capability information.

5. The method of claim 1, further comprising:
   receiving, via the first service context for communicating with the first core network service, an indication of a second core network service of the plurality of core network services;
   transmitting a second service request indicating the second core network service, the second service request comprising a second network address associated with the second core network service; and
   receiving third control signaling indicating a second service context for communicating with the second core network service based at least in part on the second service request, wherein communicating the first service message is based at least in part on receiving the second service context.

6. The method of claim 5, further comprising:
   communicating, in accordance with the second service context, a second service message comprising the second network address and second service data for the second core network service, wherein communicating the first service message is based at least in part on communicating the second service message.

7. The method of claim 5, wherein the second core network service comprises a security service associated with the first core network service, wherein the second service context comprises authentication information, a key agreement, or both.

8. The method of claim 1, wherein the service request, the first service message, or both, are transmitted to the distributed unit for relay to the first network address associated with the first core network service.

9. The method of claim 1, wherein the first service context comprises a radio access network configuration for communicating with the distributed unit as part of the first core network service.

10. The method of claim 1, further comprising:
receiving additional control signaling comprising the first control information via a wireless connection between the UE and the distributed unit.

11. The method of claim 1, wherein the first control information is identified based at least in part on a subscriber identity module associated with the UE.

12. The method of claim 1, wherein each core network service of the plurality of core network services is associated with a respective application programming interface of a plurality of application programming interfaces.

13. The method of claim 1, wherein the plurality of core network services comprise a mobility service, a connection state management service, a security service, a paging service, a radio access service, a data service, a capability management service, a location service, a messaging service, or any combination thereof.

14. A method for wireless communication at a distributed unit, comprising:
receiving, from a user equipment (UE), a service request indicating a first core network service of a plurality of core network services offered by a service-based network configured to interface with a radio access network (RAN) associated with the distributed unit, wherein the plurality of core network services are associated with a plurality of network addresses, the service request comprising a first network address associated with the first core network service, the plurality of network addresses including the first network address;
transmitting the service request to the first network address;
transmitting, to the UE, control signaling received from the first core network service based at least in part on the service request, the control signaling indicating a first service context for communications between the UE and the first core network service; and
communicating a first service message received from the UE to the first core network service in accordance with the first service context, the first service message comprising the first network address and first service data for the first core network service.

15. The method of claim 14, further comprising:
transmitting, to the UE, second control signaling indicating the plurality of core network services offered by the service-based network, the second control signaling indicating the plurality of network addresses associated with the plurality of core network services, wherein receiving the service request is based at least in part on transmitting the second control signaling.

16. The method of claim 14, further comprising:
transmitting a query for the plurality of core network services; and
receiving an indication of the plurality of core network services in response to the query, wherein transmitting the control signaling is based at least in part on receiving an indication of the plurality of core network services.

17. The method of claim 16, further comprising:
transmitting, to the UE, a network address associated with a core network discovery service offered by the service-based network, wherein the query is received from the UE and transmitted to the core network discovery service based at least in part on the network address.

18. The method of claim 16, further comprising:
transmitting, via the query, capability information associated with the UE, wherein the plurality of core network services are based at least in part on the capability information.

19. The method of claim 14, further comprising:
transmitting, via the first service context for communicating with the first core network service, an indication of a second core network service of the plurality of core network services;
receiving, from the UE, a second service request indicating the second core network service, the second service request comprising a second network address associated with the second core network service;
transmitting the second service request to the second network address; and
transmitting, to the UE, second control signaling received from the second core network service based at least in part on the second service request, the second control signaling indicating a second service context for communications between the UE and the second core network service, wherein communicating the first service message is based at least in part on transmitting the second service context.

20. The method of claim 19, further comprising:
communicating a second service message received from the UE to the second core network service in accordance with the second service context, the second service message comprising the second network address and second service data for the second core network service, wherein communicating the first service message is based at least in part on communicating the second service message.

21. The method of claim 19, wherein the second core network service comprises a security service associated with the first core network service, wherein the second service context comprises authentication information, a key agreement, or both.

22. The method of claim 14, wherein the first service context comprises a radio access network configuration for communicating with the UE as part of the first core network service.

23. The method of claim 14, wherein each core network service of the plurality of core network services is associated with a respective application programming interface of a plurality of application programming interfaces.

24. The method of claim 14, wherein the plurality of core network services comprise a mobility service, a connection state management service, a security service, a paging service, a radio access service, a data service, a capability management service, a location service, a messaging service, or any combination thereof.

25. A method for wireless communication at a first core network service, comprising:
receiving, from a user equipment (UE) via distributed unit, a service request indicating the first core network service, the service request comprising a first network address associated with the first core network service, wherein the first core network service is included within a plurality of core network services offered by a service-based network configured to interface with a radio access network (RAN) associated with the distributed unit,
transmitting, to the UE via the distributed unit, first control signaling indicating a first service context for communicating with the first core network service based at least in part on the service request; and receiving, in accordance with the first service context, a first service message comprising the first network address and first service data for the first core network service.

26. The method of claim 25, further comprising:
transmitting, via the first service context for communicating with the first core network service, an indication of a second core network service of the plurality of core network services, wherein receiving the first service message is based at least in part on the indication of the second core network service.

27. The method of claim 26, wherein the second core network service comprises a security service associated with the first core network service.

28. The method of claim 25, wherein the first service context comprises a radio access network configuration for communications between the UE and the distributed unit as part of the first core network service.

29. The method of claim 25, wherein each core network service of the plurality of core network services is associated with a respective application programming interface of a plurality of application programming interfaces.

30. The method of claim 25, wherein the plurality of core network services comprise a mobility service, a connection state management service, a security service, a paging service, a radio access service, a data service, a capability management service, a location service, a messaging service, or any combination thereof.

31. A user equipment (UE), comprising:
one or more processors; and
one or more memories coupled with the one or more processors, wherein the one or more memories comprise instructions executable by the one or more processors to cause the UE to:
identify first control information indicating a plurality of core network services offered by a service-based network configured to interface with a radio access network (RAN) associated with a distributed unit, the first control information indicating a plurality of network addresses associated with the plurality of core network services;
transmit, based at least in part on the first control information, a service request indicating a first core network service of the plurality of core network services, the service request comprising a first network address associated with the first core network service, the plurality of network addresses including the first network address;
receive control signaling indicating a first service context for communicating with the first core network service based at least in part on the service request; and
transmit, in accordance with the first service context, a first service message comprising the first network address and first service data for the first core network service.

32. The UE of claim 31, wherein the one or more processors are individually or collectively further operable to execute the instructions to cause the UE to:
transmit a query for the plurality of core network services based at least in part on establishing a wireless connection between the UE and the distributed unit; and
receive the first control information in response to the query.

33. The UE of claim 32, wherein the one or more processors are individually or collectively further operable to execute the instructions to cause the UE to:
receive, from the distributed unit, a network address associated with a core network discovery service offered by the service-based network, wherein the query is transmitted to the core network discovery service based at least in part on the network address.

34. The UE of claim 32, wherein the one or more processors are individually or collectively further operable to execute the instructions to cause the UE to:
transmit, via the query, capability information associated with the UE, wherein the plurality of core network services are based at least in part on the capability information.

35. The UE of claim 31, wherein the one or more processors are individually or collectively further operable to execute the instructions to cause the UE to:
receive, via the first service context for communicating with the first core network service, an indication of a second core network service of the plurality of core network services;
transmit a second service request indicating the second core network service, the second service request comprising a second network address associated with the second core network service; and
receive third control signaling indicating a second service context for communicating with the second core network service based at least in part on the second service request, wherein communicating the first service message is based at least in part on receiving the second service context.

\* \* \* \* \*